US012601918B2

(12) United States Patent
Jiang

(10) Patent No.: US 12,601,918 B2
(45) Date of Patent: Apr. 14, 2026

(54) OPTICAL STRUCTURE AND OPTICAL DEVICE

(71) Applicant: GUANGDONG OPPO MOBILE TELECOMMUNICATIONS CORP., LTD., Guangdong (CN)

(72) Inventor: Chuhao Jiang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 288 days.

(21) Appl. No.: 18/391,003

(22) Filed: Dec. 20, 2023

(65) Prior Publication Data

US 2024/0118557 A1 Apr. 11, 2024

Related U.S. Application Data

(63) Continuation of application No. PCT/CN2022/096672, filed on Jun. 1, 2022.

(30) Foreign Application Priority Data

Jul. 30, 2021 (CN) .......................... 202110871693.1
Jul. 30, 2021 (CN) .......................... 202121776590.9

(51) Int. Cl.
 *G02B 27/01* (2006.01)
 *G02B 6/124* (2006.01)
 (Continued)

(52) U.S. Cl.
 CPC ......... *G02B 27/0172* (2013.01); *G02B 6/124* (2013.01); *G02B 27/0081* (2013.01); *G02B 27/44* (2013.01)

(58) Field of Classification Search
 None
 See application file for complete search history.

(56) References Cited

U.S. PATENT DOCUMENTS 9,939,647 B2 * 4/2018 Vallius ............... G02B 27/0081
10,281,726 B2 * 5/2019 Vallius ................. G02B 6/0033
(Continued)

FOREIGN PATENT DOCUMENTS

CN 109459813 A 3/2019
CN 211528820 U 9/2020
(Continued)

OTHER PUBLICATIONS

Chinese First Office Action, Chinese Application No. 202110871693.1, mailed Dec. 31, 2024 (11 pages).
(Continued)

*Primary Examiner* — Jerry Rahll
(74) *Attorney, Agent, or Firm* — Ladas & Parry LLP

(57) ABSTRACT

The present application discloses an optical structure. The optical structure includes a waveguide, and a first coupling-out grating, a second coupling-out grating, and a third coupling-out grating provided on the waveguide. The third coupling-out grating is located between the first coupling-out grating and the second coupling-out grating; the first coupling-out grating is a two-dimensional grating having a plurality of first grids, and the first grid is in an asymmetric shape, such that light efficiency of the first coupling-out grating propagating along a first direction is higher than light efficiency of the first coupling-out grating propagating along a second direction.

20 Claims, 10 Drawing Sheets

(51) Int. Cl.
  *G02B 27/00* (2006.01)
  *G02B 27/44* (2006.01)

(56) References Cited

U.S. PATENT DOCUMENTS

| | | | | |
|---|---|---|---|---|
| 10,394,030 B2 * | 8/2019 | Schowengerdt | ..... | G02B 6/0016 |
| 2010/0231693 A1 * | 9/2010 | Levola | ............... | G02B 27/4272 |
| | | | | 348/51 |
| 2018/0188540 A1 * | 7/2018 | Kimmel | ............. | G02B 27/0172 |
| 2022/0206300 A1 * | 6/2022 | Park | ................... | G02B 27/0172 |

FOREIGN PATENT DOCUMENTS

| | | | | | |
|---|---|---|---|---|---|
| CN | 113495319 A | 10/2021 | | | |
| CN | 215641931 U | 1/2022 | | | |
| TW | 202041919 A | 11/2020 | | | |
| WO | 2020081085 A1 | 4/2020 | | | |
| WO | WO-2020184885 A1 * | 9/2020 | ............ | G02B 27/44 | |
| WO | 2020243111 A1 | 12/2020 | | | |
| WO | WO2020212647 A1 | 10/2022 | | | |

OTHER PUBLICATIONS

Chinese Second Office Action, Chinese Application No. 202110871693. 1, mailed May 24, 2025 (17 pages).
Notification to Grant Patent Right for Invention, Chinese Application No. 202121776590.9, mailed Dec. 20, 2021 (3 pages).
International Search Report and Written Opinion, International Application No. PCT/CN2022/096672, mailed Aug. 15, 2022 (16 pages).

* cited by examiner

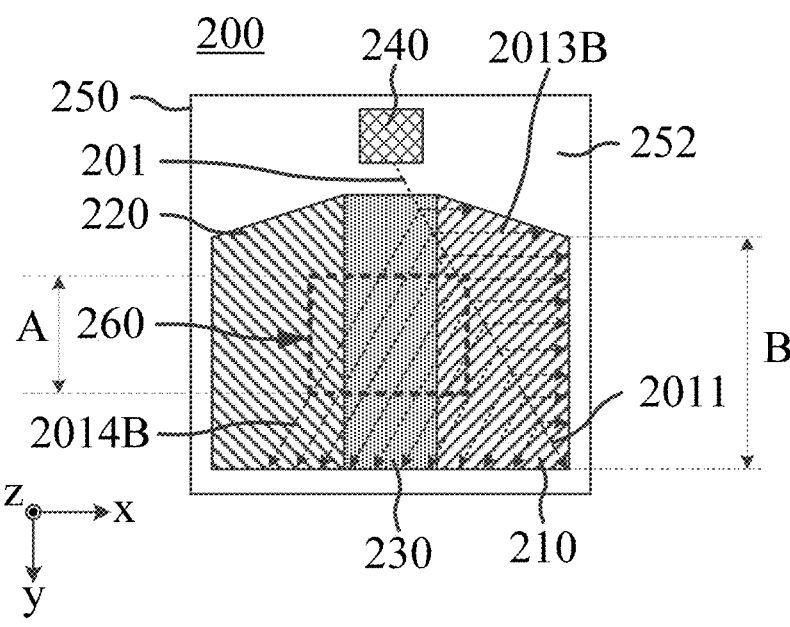
FIG. 7
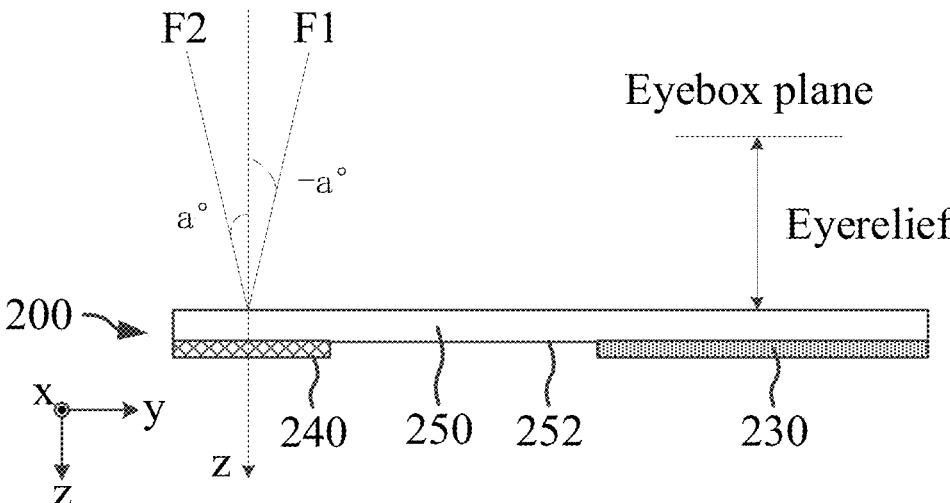
FIG. 8
FIG. 9

OPTICAL STRUCTURE AND OPTICAL DEVICE

This application is a continuation of International Patent Application No. PCT/CN2022/096672, filed Jun. 1, 2022, which claims priority to the China Patent Application No. 202110871693.1, filed Jul. 30, 2021, and China Patent Application No. 202121776590.9, filed Jul. 30, 2021, all of which are incorporated by reference in their entireties.

TECHNICAL FIELD

The present disclosure relates to the field of optical technologies, in particular, to an optical structure and an optical device.

BACKGROUND

An optical device such as an augmented reality (abbreviated as AR) device and a virtual reality (abbreviated as VR) device is able to display images through its own display device. Technologies related to the AR device and/or the VR device are increasingly used in various fields, such as military, medical, construction, education, engineering, film and television, entertainment and others.

AR glasses are one of the main implementation solutions of the AR device. A near-eye display system of the AR glasses adopts pixels on the display device to form a distant virtual image through a series of optical imaging elements and projects it into human eyes. An AR glasses product needs to meet a see-through requirement, including the need to see both the real external world and virtual information, so the imaging system shall not block the front of the sight. For example, adding an optical combiner or a group of optical combiners to integrate virtual information and real scenes through "layering".

In the related art, AR glasses have many optical implementation solutions such as catadioptric, reflective light waveguide, one-dimensional diffractive light waveguide, two-dimensional diffractive light waveguide, holographic light waveguide, etc. The two-dimensional diffractive waveguide (abbreviated as TDDW) is considered to be the most promising optical solution for consumer-grade AR glasses due to the characteristics of thinness, high penetration of external light, good color reproduction, and large field-of-view (FOV).

In the related art, a coupling-in grating of a general TDDW architecture couples light from a projector into a waveguide. The light coupled into the waveguide proceeds toward the coupling-out grating through total internal reflection. After reaching the coupling-out grating, the light is diffracted and divided into dilated pupil light propagating to the left and dilated pupil light propagating to the right. Each time the light interacts with the coupling grating, a part of the energy may be coupled out to the human eyes, allowing a user to see the image of the projector. When light from an edge field-of-view is incident, the dilated pupil light propagating on one side may enter the human eyes, and the exit pupil uniformity of the edge field-of-view is poor.

SUMMARY OF THE DISCLOSURE

The embodiments of the present disclosure provide an optical structure. The optical structure includes a waveguide, a first coupling-out grating, a second coupling-out grating and a third coupling-out grating. The first coupling-out grating is arranged on the waveguide. The second coupling-out grating is arranged on the waveguide. The third coupling-out grating is arranged on the waveguide. The third coupling-out grating is located between the first coupling-out grating and the second coupling-out grating. The first coupling-out grating is a two-dimensional grating with a plurality of first grids. The first grid has an asymmetric shape to allow light propagation efficiency of the first coupling-out grating along a first direction is higher than light propagation efficiency of the first coupling-out grating along a second direction. The first direction is a direction in which the first coupling-out grating faces the second coupling-out grating, and the first direction is opposite to the second direction.

The embodiments of the present disclosure provide another optical structure. The optical structure includes a waveguide, a first coupling-out grating, a second coupling-out grating, a third coupling-out grating and a coupling-in grating. The first coupling-out grating is arranged on the waveguide. The second coupling-out grating is arranged on the waveguide. The third coupling-out grating is arranged on the waveguide. The third coupling-out grating is located between the first coupling-out grating and the second coupling-out grating. The coupling-in grating is arranged at a same side of the first coupling-out grating, the second coupling-out grating and the third coupling-out grating, and the coupling-in grating and the third coupling-out grating are arranged side by side. The third coupling-out grating includes at least two sub-coupling-out gratings. A junction of two adjacent sub-coupling-out gratings is located within an eyebox of the optical structure, and diffraction efficiency of the sub-coupling-out grating away from the coupling-in grating is greater than diffraction efficiency of the sub-coupling-out grating close to the coupling-in grating.

The present disclosure provides an optical device. The optical device includes a projector and any of the optical structures described above. The projector is configured to provide augmented reality or virtual reality images.

BRIEF DESCRIPTION OF THE DRAWINGS

In order to explain the technical solutions in the embodiments of the present disclosure more clearly, the drawings needed to be used in the description of the embodiments may be briefly introduced below. Obviously, the drawings in the following description are only some embodiments of the present disclosure. For those skilled in the art, other drawings may be obtained based on these drawings without exerting creative efforts.

For a more complete understanding of the present disclosure and its beneficial effects, the following description may be made in conjunction with the accompanying drawings, and the same reference numerals refer to the same parts in the following description.

FIG. 7 is a schematic view of light in an edge field-of-view transmitting along a plane in an optical structure provided by the embodiments of the present disclosure.

FIG. 8 is a schematic view of an application scenario of an optical structure provided by the embodiments of the present disclosure.

FIG. 9 is a grating vector view of a first coupling-out grating provided by the embodiments of the present disclosure.

DETAILED DESCRIPTION

Figure 1:
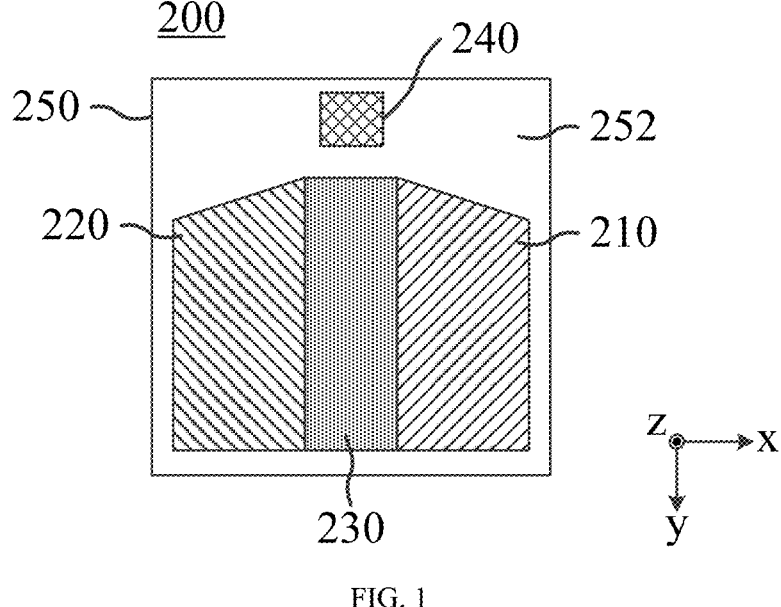
FIG. 1 is a structural schematic view of an optical structure provided by the embodiments of the present disclosure.

The technical solutions in the embodiments of the present disclosure are clearly and completely described below with reference to the accompanying drawings in the embodiments of the present disclosure. Obviously, the described embodiments are only some, but not all, of the embodiments of the present disclosure. Based on the embodiments in the present disclosure, all other embodiments obtained by those skilled in the art without creative efforts fall within the protection scope of the present disclosure.

The present disclosure provides an optical structure. The optical structure includes a waveguide, a first coupling-out grating, a second coupling-out grating and a third coupling-out grating. The first coupling-out grating is arranged on the waveguide. The second coupling-out grating is arranged on the waveguide. The third coupling-out grating is arranged on the waveguide. The third coupling-out grating is located between the first coupling-out grating and the second coupling-out grating. The first coupling-out grating is a two-dimensional grating with a plurality of first grids. The first grid has an asymmetric shape to allow light propagation efficiency of the first coupling-out grating along a first direction is higher than light propagation efficiency of the first coupling-out grating along a second direction. The first direction is a direction in which the first coupling-out grating faces the second coupling-out grating, and the first direction is opposite to the second direction.

In an embodiment, the optical structure includes a coupling-in gratin. The coupling-in grating is arranged at a same side of the first coupling-out grating, the second coupling-out grating and the third coupling-out grating. The coupling-in grating and the third coupling-out grating are arranged side by side. The first grid includes four vertices capable of forming a first diagonal line and a second diagonal line. A length of the first diagonal line is greater than a length of the second diagonal line, an angle between the first diagonal line and the third coupling-out grating along a third direction is an acute angle, and an angle between the second diagonal line and the third coupling-out grating along the third direction is an obtuse angle. The third direction is a direction in which the third coupling-out grating faces the coupling-in grating.

In an embodiment, the optical structure further includes a coupling-in grating. The coupling-in grating is arranged at a same side of the first coupling-out grating, the second coupling-out grating and the third coupling-out grating. The coupling-in grating and the third coupling-out grating are arranged side by side. The first grid includes at least five vertices. The vertices of the first grid include two vertices close to the third coupling-out grating and three vertices away from the third coupling-out grating. The two vertices close to the third coupling-out grating and the three vertices away from the third coupling-out grating are capable of forming a third diagonal line and a fourth diagonal line. A length of the third diagonal line is greater than a length of the fourth diagonal line, an angle between the third diagonal line and the third coupling-out grating along a fourth direction is an acute angle, and an angle between the fourth diagonal line and the third coupling-out grating along the fourth direction is an obtuse angle. The fourth direction is a direction in which the third coupling-out grating faces the coupling-in grating.

In an embodiment, the optical structure includes a coupling-in grating. The coupling-in grating is arranged at a same side of the first coupling-out grating, the second coupling-out grating and the third coupling-out grating, and the coupling-in grating and the third coupling-out grating are arranged side by side. The first grid includes three vertices and has a first vertex-connecting line, a second vertex-connecting line and a third vertex-connecting line. The first vertex-connecting line is close to the third coupling-out grating, and the second vertex-connecting line is away from the third coupling-out grating. A length of the first vertex-connecting line is greater than a length of the second vertex-connecting line, an angle between the first vertex-connecting line and the third coupling-out grating along a five direction is an acute angle, and an angle between the second vertex-connecting line and the third coupling-out grating in the fifth direction is an obtuse angle. The fifth direction is a direction in which the third coupling-out grating faces the coupling-in grating.

In an embodiment, the first coupling-out grating has a plurality of grid groups, each grid group includes a plurality of the first grids, each first grid in the grid group intersects with its adjacent first grid, and each grid group is spaced apart from each other.

In an embodiment, each grid group is parallel to each other.

In an embodiment, each first grid in each grid group is arranged along a sixth direction, the sixth direction is a direction in which a seventh direction rotates 30 degrees clockwise, and the seventh direction is a direction in which the third coupling-out grating faces the coupling-in grating.

In an embodiment, the second coupling-out grating and the first coupling-out grating are arranged axially symmetrically with respect to the third coupling-out grating, the second coupling-out grating is a two-dimensional grating with a plurality of second grids, and all the second grids of the second coupling-out grating have a same shape and arrangement as those of all the first gratings of the first coupling-out grating.

In an embodiment, the third coupling-out grating includes at least two sub-coupling-out gratings, a junction of two adjacent sub-coupling-out gratings is located within an eyebox of the optical structure, and diffraction efficiency of the sub-coupling-out grating away from the coupling-in grating is greater than the diffraction efficiency of the sub-coupling-out grating close to the coupling-in grating.

In an embodiment, the third coupling-out grating includes at least three sub-coupling-out gratings. The at least three sub-coupling-out gratings includes a first sub-coupling-out grating partially located on one side of the eyebox, a second sub-coupling-out grating partially located on another side of the eyebox, and at least one sub-coupling-out grating completely located within the eyebox. A length of the first sub-coupling-out grating along an arrangement direction of all the sub-coupling-out gratings is greater than a sum of the lengths of the at least one sub-coupling-out grating located within the eyebox along the arrangement direction of all the sub-coupling-out gratings. A length of the second sub-coupling-out grating along the arrangement direction of all the sub-coupling-out gratings is greater than the sum of the lengths of the at least one sub-coupling-out grating located within the eyebox along the arrangement direction of all the sub-coupling-out gratings.

In an embodiment, the first coupling-out grating includes at least two sub-coupling-out gratings. A number of the sub-coupling-out gratings of the first coupling-out grating is equal to a number of the sub-coupling-out gratings of the third coupling-out grating, a junction of two adjacent sub-coupling-out gratings of the first coupling-out grating is located within the eyebox of the optical structure, and diffraction efficiency of the sub-coupling-out grating of the first coupling-out grating away from the coupling-in grating is greater than the diffraction efficiency of the sub-coupling-out grating close to the coupling-in grating. The second coupling-out grating includes at least two sub-coupling-out gratings. A number of the sub-coupling-out gratings of the second coupling-out grating is the same as a number of the sub-coupling-out gratings of the third coupling-out grating, a junction of two adjacent sub-coupling-out gratings of the second coupling-out grating is located within the eyebox of the optical structure, and diffraction efficiency of the sub-coupling-out grating of the second coupling-out grating away from the coupling-in grating is greater than the diffraction efficiency of the sub-coupling-out grating close to the coupling-in grating.

In an embodiment, the third coupling-out grating is a two-dimensional grating with a plurality of third grids, and the third grid is symmetrical. The first coupling-out grating, the second coupling-out grating and the third coupling-out grating are all two-dimensional gratings. Grating periods of the first coupling-out grating, the second coupling-out grating and the third coupling-out grating are equal. Refractive index of either of the first coupling-out grating, the second coupling-out grating and the third coupling-out grating to the waveguide is 1.5-3. Grating period of the coupling-in grating is one-half of the grating period of the first coupling-out grating along a direction perpendicular to the first direction.

The present disclosure provides another optical structure. The optical structure includes a waveguide, a first coupling-out grating, a second coupling-out grating, a third coupling-out grating and a coupling-in grating. The first coupling-out grating is arranged on the waveguide. The second coupling-out grating is arranged on the waveguide. The third coupling-out grating is arranged on the waveguide. The third coupling-out grating is located between the first coupling-out grating and the second coupling-out grating. The coupling-in grating is arranged at a same side of the first coupling-out grating, the second coupling-out grating and the third coupling-out grating, and the coupling-in grating and the third coupling-out grating are arranged side by side. The third coupling-out grating includes at least two sub-coupling-out gratings. A junction of two adjacent sub-coupling-out gratings is located within an eyebox of the optical structure, and diffraction efficiency of the sub-coupling-out grating away from the coupling-in grating is greater than diffraction efficiency of the sub-coupling-out grating close to the coupling-in grating.

In an embodiment, at least a part of all the sub-coupling-out gratings is located within the eyebox.

In an embodiment, the third coupling-out grating includes at least three sub-coupling-out gratings. The at least three sub-coupling-out gratings include a first sub-coupling-out grating partially located on one side of the eyebox, a second sub-coupling-out grating partially located on another side of the eyebox, and at least one sub-coupling-out grating completely located within the eyebox. A length of the first sub-coupling-out grating along an arrangement direction of all the sub-coupling-out gratings is greater than a sum of the lengths of the at least one sub-coupling-out grating located within the eyebox along the arrangement direction of all the sub-coupling-out gratings. A length of the second sub-coupling-out grating along the arrangement direction of all the sub-coupling-out gratings is greater than the sum of the lengths of the at least one sub-coupling-out grating located within the eyebox along the arrangement direction of all the sub-coupling-out gratings.

In an embodiment, a number of the sub-coupling-out gratings located completely within the eyebox is one, two or three. Diffraction efficiency of all the sub-coupling-out grating increases proportionally from a direction closest to the sub-coupling-out grating to a direction farthest from the sub-coupling-out grating.

In an embodiment, the first sub-coupling-out grating and the second sub-coupling-out grating are arranged symmetrically with respect to the sub-coupling-out grating completely located within the eyebox.

In an embodiment, a ratio of a length of the first sub-coupling-out grating or the second sub-coupling-out grating along the arrangement direction of all the sub-coupling-out gratings to a length of all the sub-coupling-out gratings is P1. A ratio of the length of all the sub-coupling-out gratings located completely within the eyebox along the arrangement direction of all the sub-coupling-out gratings to the length of all sub-coupling-out gratings is P2. P1 is greater than or equal to 30%, P1 is less than or equal to 45%, P2 is greater than or equal to 10%, and P2 is less than 30%.

In an embodiment, the first coupling-out grating includes at least two sub-coupling-out gratings, and a number of the sub-coupling-out gratings of the first coupling-out grating is equal to a number of the sub-coupling-out gratings of the third coupling-out grating, and a junction of two adjacent sub-coupling-out gratings of the first coupling-out grating is located within the eyebox of the optical structure. Diffraction efficiency of the sub-coupling-out grating of the first coupling-out grating away from the coupling-in grating is greater than diffraction efficiency of the sub-coupling-out grating close to the coupling-in grating. The second coupling-out grating includes at least two sub-coupling-out gratings. A number of the sub-coupling-out gratings of the second coupling-out grating is the same as a number of the sub-coupling-out gratings of the third coupling-out grating. A junction of two adjacent sub-coupling-out gratings of the second coupling-out grating is located within the eyebox of the optical structure. Diffraction efficiency of the sub-coupling-out of the second coupling-out grating away from the coupling-in grating is greater than diffraction efficiency of the sub-coupling-out grating close to the coupling-in grating.

In an embodiment, the third coupling-out grating is a two-dimensional grating, the coupling-in grating is a one-dimensional grating, grating period of the third coupling-out grating along an arrangement direction of all the sub-coupling-out gratings of the third coupling-out grating is twice the grating period of the coupling-in grating, the first coupling-out grating and the second coupling-out grating are both one-dimensional gratings, or both the first coupling-out grating and the second coupling-out grating are two-dimensional gratings. Refractive index of any one of the first coupling-out grating, and the second coupling-out grating, the third coupling-out grating and the coupling-in grating to the waveguide is 1.5-3. Periods of the first coupling-out grating, the second coupling-out grating and the coupling-in grating are equal, in response to the first coupling-out grating and the second coupling-out grating being one-dimensional gratings. Periods of the first coupling-out grating, the second coupling-out grating and the third coupling-out grating are equal, in response to the first coupling-out grating and the second coupling-out grating being two-dimensional gratings.

The present disclosure provides an optical device. The optical device includes a projector and the optical structure described above. The projector is configured to provide augmented reality or virtual reality images.

As illustrated in FIG. 1, FIG. 1 is a structural schematic view of an optical structure provided by the embodiments of the present disclosure, which illustrates a reference system (x, y, z). The optical structure 200 includes a waveguide 250, a coupling-in grating 240 disposed on the waveguide, and a plurality of coupling-out gratings (a coupling-out grating 210, a coupling-out grating 220, and a coupling-out grating 230). The waveguide 250, the coupling-in grating 240 and the plurality of coupling-out gratings (the coupling-out grating 210, the coupling-out grating 220 and the coupling-out grating 230) of the optical structure 200 are all arranged in the x-y plane.

The waveguide 250 serves as a carrier of the optical structure 200. The waveguide 250 may, for example, conduct optical signals through total internal reflection. The waveguide 250 may have two oppositely disposed surfaces, such as including a first surface 252 and a second opposite to each other. The second surface is provided opposite to the first surface 252, and the second surface is blocked and not illustrated in FIG. 1.

The coupling-in grating 240 is disposed on one surface of the waveguide 250, such as the first surface 252. The coupling-in grating 240 may receive an optical signal (also referred to as light) emitted from a projector (not illustrated in the drawings), and couple the optical signal into the waveguide 250. The waveguide 250 may conduct the optical signal after receiving the optical signal coupled from the coupling-in grating 240.

The coupling-in grating 240 may be any one of a blazed grating, a rectangular grating, and a tilted grating. The coupling-in grating 240 may be a one-dimensional grating.

The plurality of coupling-out gratings may include the first coupling-out grating 210, the second coupling-out grating 220, and the third coupling-out grating 230. The first coupling-out grating 210, the second coupling-out grating 220 and the third coupling-out grating 230 are all disposed on the waveguide 250. The third coupling-out grating 230 is located between the first coupling-out grating 210 and the second coupling-out grating 220. In some embodiments, the first coupling-out grating 210, the second coupling-out grating 220 and the third coupling-out grating 230 are disposed on a same surface of the waveguide 250, such as the first surface 252. The first coupling-out grating 210, the second coupling-out grating 220 and the third coupling-out grating 230 may also be disposed on another surface of the waveguide 250, that is, the second surface opposite to the first surface.

In some embodiments, one of the first coupling-out grating 210, the second coupling-out grating 220 and the third coupling-out grating 230 may be disposed on a surface of the waveguide 250, such as the first surface 252, and the other two of the first coupling-out grating 210, the second coupling-out grating 220 and the third coupling-out grating 230 may be disposed on another surface of the waveguide 250, that is, the second surface of the waveguide 250. Any combination of the coupling-in grating 240, the first coupling-out grating 210, the second coupling-out grating 220 and the third coupling-out grating 230 is disposed on any surface of the waveguide 250 is within the scope of protection of the embodiments of the present disclosure.

The coupling-in grating 240 in the embodiments of the present disclosure may be disposed on a same side with respect to the first coupling-out grating 210, the second coupling-out grating 220 and the third coupling-out grating 230, and the coupling-in grating 240 and the third coupling-out grating 230 are arranged side by side. In the embodiments of the present disclosure, the first coupling-out grating 210 and the second coupling-out grating 220 have a same shape, and the first coupling-out grating 210 and the second coupling-out grating 220 are symmetrically arranged relative to the third coupling-out grating 230. In other words, the first coupling-out grating 210 and the second coupling-out grating 220 are arranged in mirror images relative to the third coupling-out grating 230. The shapes of the first coupling-out grating 210 and the second coupling-out grating 220 may also be different, or may not be arranged symmetrically with respect to the third coupling-out grating 230.

The waveguide 250 may transmit the optical signal coupled into the coupling-in grating 240 toward the first coupling-out grating 210, the second coupling-out grating 220 and the third coupling-out grating 230 through total internal reflection, and then be divided into several parts through diffraction and conducted in multiple directions after reaching the first coupling-out grating 210, the second coupling-out grating 220 and the third coupling-out grating 230. A part of the light signal is coupled out and reaches the human eyes, allowing a user to see the image of the projector.

Figure 2:
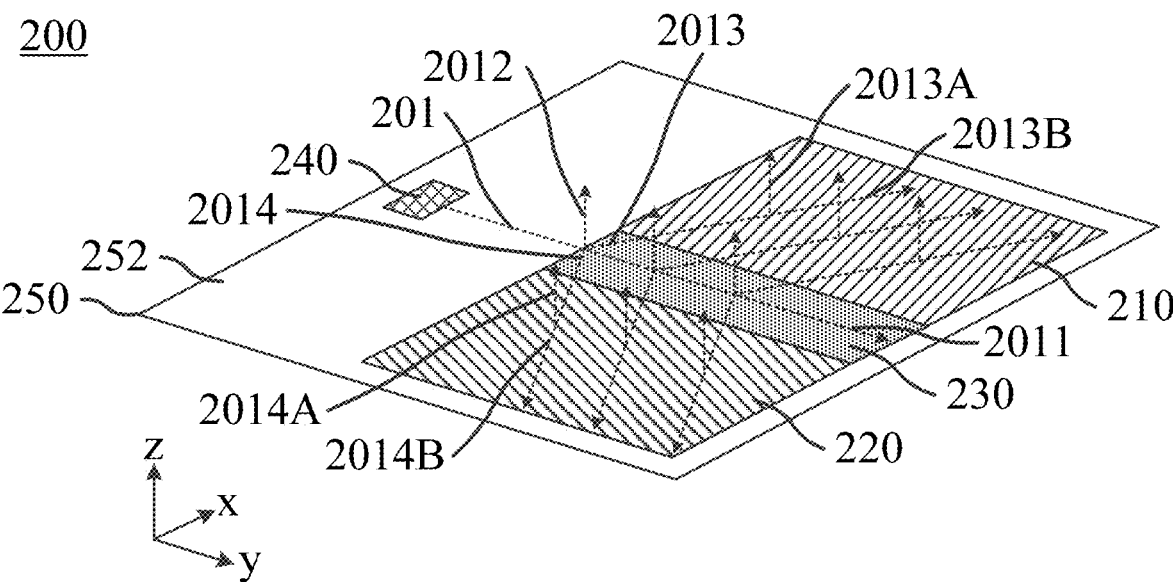
FIG. 2 is a three-dimensional view of an optical structure provided by the embodiments of the present disclosure.

As illustrated in FIG. 2, FIG. 2 is a three-dimensional view of an optical structure provided by the embodiments of the present disclosure. FIG. 2 illustrates an optical signal transmission of incident central field-of-view light undergoing diffraction, and illustrates a reference system (x, y, z). After the central field-of-view light is incident on the coupling-in grating 240, the coupling-in grating 240 transmits light 201 toward the third coupling-out grating 230 through the waveguide 250. After interacting with the third coupling-out grating 230, the light 201 is split into four light beams through diffraction, namely light 2011, light 2012, light 2013 and light 2014.

The light 2011 proceeds along an original path of the light 201. The light 201 is split into four beams of light after being diffracted by the third coupling-out grating 230. The light 2011 may interact with the third coupling-out grating 230 for multiple times while traveling along the original path of the light 201, and is split into 4 beams of light after each time of diffraction. In other words, when moving along the original path of the light 201, the light 2011 interacts with the third coupling-out grating 230 many times and is diffracted and split into multiple beams of light 2013, multiple beams of light 2014, multiple beams of light 2014 and multiple beams of light 2011. Since the multiple beams of light 2011 all proceed along the original path of light 201, the multiple beams of light 2011 are displayed as a beam of light. The light 2011 interacts with the third coupling-out grating 230 for each time, the energy of the light traveling along the original path may decrease.

The light 2012 is directly coupled out from the third coupling-out grating 230, or the light 2012 is coupled out toward a positive direction of z based on the x-y plane. In the embodiments of the present disclosure, all light directly coupled out from the third coupling-out grating 230 are defined as the light 2012. The energy of different light beams directly coupled out from different positions of the third coupling-out grating 230 is different.

After interacting with the first coupling-out grating 210, the light 2013 is diffracted and split into two beams of light, namely light 2013A and light 2013B. The light 2013A is directly coupled out from the first coupling-out grating 210, which may be understood as the light 2013A is coupled out toward the positive direction of z based on the x-y plane. The light 2013B moves along an original path of the light 2013. In the embodiments of the present disclosure, the light propagating from the third coupling-out grating 230 toward the first coupling-out grating 210 is defined as the light 2013. There are multiple beams of light 2013. Each beam of light 2013 interacts with the first coupling-out grating 210 and is diffracted and split into multiple beams of light 2013A and multiple beams of light 2013B. Different beams of light 2013 have different energies, different beams of light 2013A have different energies, and different beams of light 2013B have different energies.

After interacting with the second coupling-out grating 220, the light 2014 is diffracted and split into two beams of light, namely light 2014A and light 2014B. The light 2014A is directly coupled out from the second coupling-out grating 210, which may be understood as the light 2014A is coupled out towards the positive direction of z based on the x-y plane. The light 2014B follows an original path of the light 2014. In the embodiments of the present disclosure, the light propagating from the third coupling-out grating 230 toward the second coupling-out grating 220 is defined as the light 2014. There are multiple beams of light 2014. Each beams of light 2014 interacts with the second coupling-out grating 220 and is diffracted and split into multiple beams of light 2014A and multiple beams of light 2014B. Different beams of light 2014 have different energies, different beams of light 2014A have different energies, and different beams of light 2014B have different energies.

The light coupled out toward the positive direction of z based on the x-y plane may be incident on the human eyes, allowing the user to see the image of the projector. As illustrated in FIG. 2, in the example illustrated in FIG. 2, the light 2012 coupled out from the third coupling-out grating 230 toward the positive direction of z may be incident on the human eyes. The light 2013A coupled out from the first coupling-out grating 210 toward the positive direction of z may be incident into the human eyes, and the light 2014A coupled out from the second coupling-out grating 220 toward the positive direction of z may be incident into the human eyes.

Figure 3:
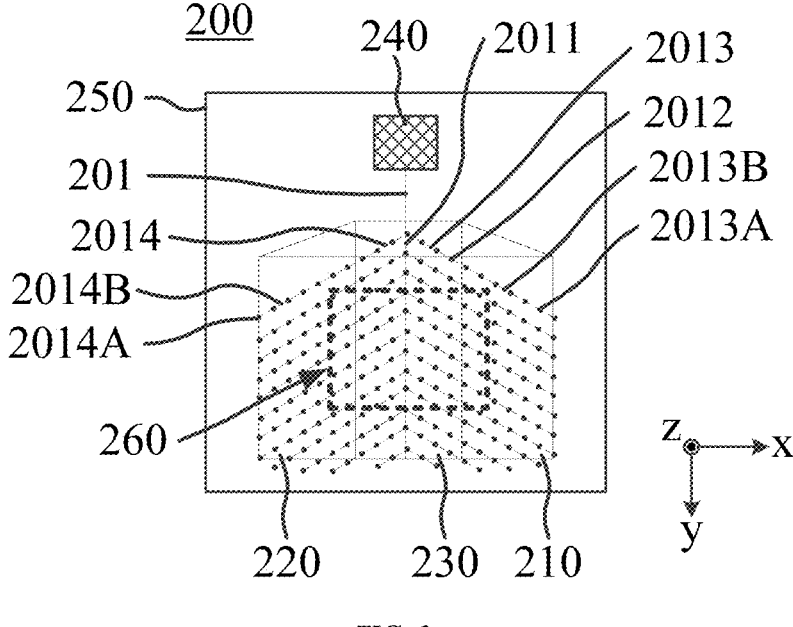
FIG. 3 is a schematic view of light in a central field-of-view transmitting in an optical structure provided by the embodiments of the present disclosure.
Figure 4:
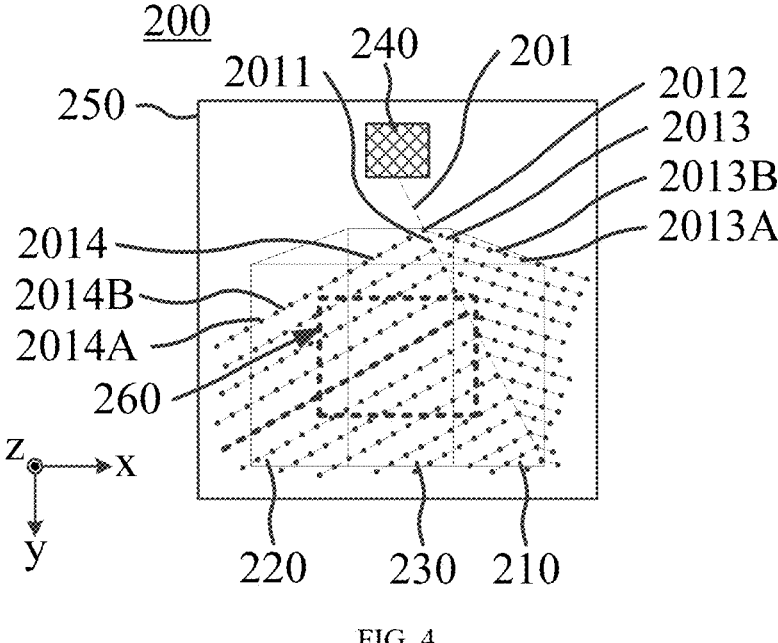
FIG. 4 is a schematic view of light in an edge field-of-view transmitting in an optical structure provided by the embodiments of the present disclosure.

The light 2011, the light 2012, the light 2013, and the light 2014 illustrated in FIG. 2 are exemplary, and there is no limit to the number of beams of light coupled out of the optical structure 200. In other words, FIG. 2 illustrates a part of the light when the optical structure 200 couples out the light, and the remaining light are not illustrated provided by the embodiments of the present disclosure As illustrated in FIG. 3 and FIG. 4, FIG. 3 is a schematic view of light in a central field-of-view transmitting in an optical structure provided by the embodiments of the present disclosure, and FIG. 4 is a schematic view of light in an edge field-of-view transmitting in an optical structure provided by the embodiments of the present disclosure. The coupling-in grating 240 transmits the coupled light 201 to the third coupling-out grating 230 through the waveguide 250, and interacts with the third coupling-out grating 230 to split a plurality of beams of light such as the light 2011, the light 2012, the light 2013 and the light 2014. Transmission directions of the light 2011, the light 2012, the light 2013 and the light 2014 may be seen in FIG. 2 and related content, and will not be described again here. The light 2012 is represented by a dot in the x-y plane. The light 2013 interacts with the first coupling-out grating 210 to split multiple beams of light such as the light 2013A and the light 2013B. The light 2013A and the light 2013B are illustrated in FIG. 2 and related content, and may not be described again here. The light 2013A is represented by a dot in the x-y plane. The light 2014 interacts with the second coupling-out grating 220 to split multiple beams of light such as the light 2014A and the light 2014B. The light 2014A and the light 2014B are illustrated in FIG. 2 and related content, and will not be described again here. The light 2014A is represented by a dot in the x-y plane. As illustrated in FIG. 3 and FIG. 4, each dot represents the light that interacts with a coupling-out grating, and the light represented by the dot may be incident on the human eyes.

FIG. 3 and FIG. 4 show that each coupling-out grating may couple out multiple beams of light along the positive z-axis direction.

Only a part of the light represented by the dots in FIG. 3 and FIG. 4 may be incident on the human eyes.

Figure 5:
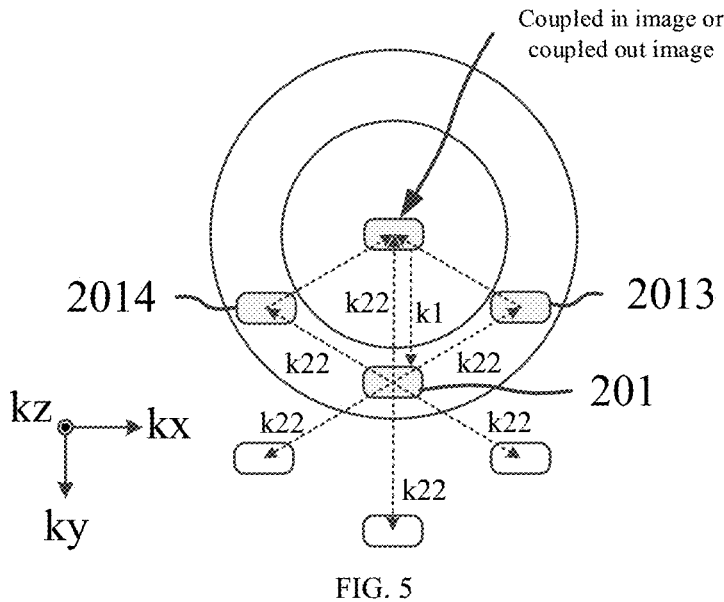
FIG. 5 is a schematic view of a light transmission process principle in a k-space of the optical structure provided by the embodiments of the present disclosure.

As illustrated in FIG. 5, FIG. 5 is a schematic view of a light transmission process principle in a k-space of the optical structure provided by the embodiments of the present disclosure, and illustrates a reference system (kx, ky, kz). Two circle radii illustrated in FIG. 5 are refractive index of the environment and refractive index of the waveguide. The radius of the small circle, which is the radius of the inner circle, is the refractive index of the environment, and the radius of the large circle, which is the radius of the outer circle, is the refractive index of the waveguide. Each rectangle represents a field-of-view (FOV). Rectangles at different positions represent different states of the light in the field-of-view. For example, the rectangle in the center of the circle represents the field-of-view in which light (the light 2012, the light 2013A, the light 2014A) is incident or coupled out from the projector to the waveguide 250. The rectangle within a ring (that is, between the two circles) represents the light in the field-of-view passing through the grating (the first coupling-out grating 210, the second coupling-out grating 220 and the coupling-in grating 240) propagates in the waveguide 240 after being coupled. If the field-of-view is within the small circle, it means that the light may be coupled out of the waveguide 250. If the field-of-view is within the ring, it means that the light propagates within the waveguide 250. If the field-of-view is outside the large circle, it means that the light does not actually exist. At the coordinate origin, the field-of-view is diffracted (k1) by the coupling-in grating 240 and coupled into the waveguide 250. Then the light 201 changes to 6 different positions around its k space through 6 diffraction components k22 of the third coupling-out grating 230. The light 2013 and the light 2014 are still within the ring, which means that they may propagate through total internal reflection to the left and right along the kx axis respectively and become dilated pupil light. There is also some light that may be diffracted and translated upward to coincide with the original incident image, which means that they (such as light 2012) may be directly coupled out. The remaining three positions are all outside the ring, which means that these three diffraction components do not exist. Not all the energy of the light 201 is diffracted. On the contrary, it may retain most of the energy unchanged, which means that most of the energy continues to propagate along the propagation direction of the light 201 through total internal reflection.

In the embodiments of the present disclosure, an area where the light in the optical structure 200 being coupled out and emitted into the human eyes is defined as an eyebox 260. In other words, the light located within the eyebox 260 and coupled along the positive direction of the z-axis may be incident on the human eyes.

The eyebox is explained below.

Figure 6:
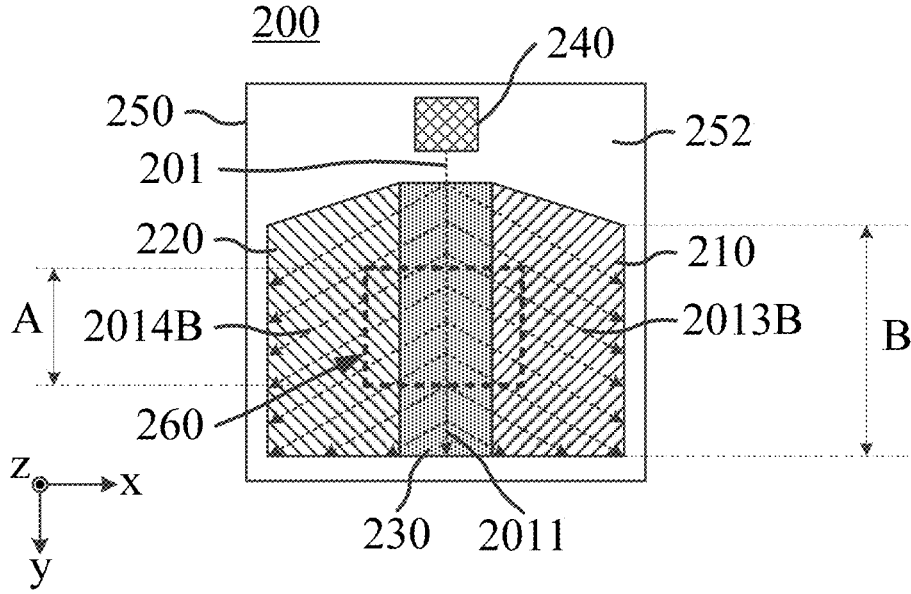
FIG. 6 is a schematic view of light in a central field-of-view transmitting along a plane in an optical structure provided by the embodiments of the present disclosure.

As illustrated in FIG. 6 to FIG. 8, FIG. 6 is a schematic view of light in a central field-of-view transmitting along a plane in an optical structure provided by the embodiments of the present disclosure, FIG. 7 is a schematic view of a light in an edge field-of-view transmitting along a plane in an optical structure provided by the embodiments of the present disclosure, and FIG. 8 is a schematic view of an application scenario of an optical structure provided by the embodiments of the present disclosure. Assuming that an angle range between the incident field-of-view and the z-axis in the y-z plane is –a° to a°, that is, the angle range between a maximum incident field-of-view F2 and the z-axis is a° in the y-z plane, and the angle range between a minimum incident field-of-view F1 and the z-axis is –a° in the y-z plane. A distance (eyerelief) from the human eyes to the waveguide 250 is b, that is, the distance from a plane of the eyebox or an observation plane of the human eyes to the waveguide 250 is b. A length of the eyebox 260 along the y-axis direction is B, and B=A−2b*tan(a).

A is a minimum length of the first coupling-out grating 210 along the y-axis direction, and A may also be a minimum length of the second coupling-out grating 210 along the y-axis direction. In the embodiments of the present disclosure, the minimum length of the first coupling-out grating 210 along the y-axis direction is the same as the minimum length of the second coupling-out grating 220 along the y-axis direction.

In an embodiment of the present disclosure, a center of the eyebox 260 may coincide with a center of the third coupling-out grating 230.

As illustrated in FIG. 2, FIG. 3 and FIG. 6, when the light in the central field-of-view is incident on the optical structure 200, the light, such as a part of the light 2012, the light 2013A and the light 2014A, coupled out by the first coupling-out grating 210, the second coupling-out grating 220 and the third coupling-out grating 230, may be in the eyebox 260. In other words, the light may be emitted into the human eyes.

As illustrated in FIG. 4 and FIG. 7, when the light in an edge field-of-view is incident on the optical structure 200, only a part of the light 2012 and light 2014A coupled out by the second coupling-out grating 220 and the third coupling-out grating 230 may be in the eyebox 260, while basically all the light coupled out by the first coupling-out grating 210, such as the light 2013A, is not within the eyebox 260. In other words, the energy of the light coupled out by the second coupling-out grating 220 and the third coupling-out grating 230 is utilized, while the energy of the light coupled out by the first coupling-out grating 210 is wasted, which often results in poor exit pupil uniformity of the edge field-of-view.

In the waveguide architecture in the related art, the exit pupil uniformity of the edge field-of-view is significantly worse than that of the center field-of-view. This means that when viewing the projected image at certain position of the eyebox, brightness gap of the center field-of-view and the edge field-of-view may vary largely, causing viewing discomfort for the user.

Based on this, the first coupling-out grating 210 defined in the embodiments of the present disclosure has a two-dimensional grating structure and has a plurality of first grids, and each grid has an asymmetric shape, such that light propagation efficiency of the first coupling-out grating 210 along a first direction is higher than light propagation efficiency along the second direction of the first coupling-out grating 210. Wasted energy of the light coupled out by the first coupling-out grating 210 is smaller than the energy of other light, thereby improving the exit pupil brightness and exit pupil uniformity of each field-of-view, and reducing the energy ratio difference between each field-of-view. For example, the exit pupil brightness and exit pupil uniformity of the edge field-of-view may be improved, and the difference between the energy of the edge field-of-view and the energy of the center field-of-view may be reduced. Especially when the optical structure 200 is applied to a head-mounted display product such as AR, it may suppress rainbow pattern effect of sunlight and improve image quality of the product.

The first direction is a direction in which the first coupling-out grating 210 faces the second coupling-out grating 220, such as a negative direction of the x-axis illustrated in FIG. 1. The second direction is a direction in which the second coupling-out grating 220 faces the first coupling-out grating 210, such as a positive direction of the x-axis illustrated in FIG. 1. In the embodiments of the present disclosure, the first direction and the second direction are opposite.

As illustrated in FIG. 9, FIG. 9 is a grating vector view of a first coupling-out grating provided by the embodiments of the present disclosure. The first coupling-out grating 210 has multi-order diffraction vectors, including (1, 1), (1, 0), (0, 1), (0, −1), (−1, 0), (−1, −1). Diffraction efficiency of the (1, 0) order and (−1, 0) order among the diffraction orders of the first coupling-out grating 210 may be significantly higher than that of the (0,1) order and (0, −1) order. When the light 201 is incident on the first coupling-out grating 210, the light 2014B is produced through diffraction by the (−1, 0) order of the first coupling-out grating 210, and the light 2013B is produced through diffraction by the (0, 1) order of the first coupling-out grating 210. Therefore, the light 2014B propagating to the left (the first direction) in the drawings, is much more efficient than the light 2013B propagating to the right (the second direction) in the drawings.

To explain in detail the asymmetric shape of the first grating 212 in the embodiments of the present disclosure, which contributes to the light efficiency of the first coupling-out grating 210 propagating in the first direction being higher than the light efficiency of the first coupling-out grating 210 propagating in the second direction, the following description may be made with reference to the schematic view of the first coupling-out grating 210.

Figures 10, 11:
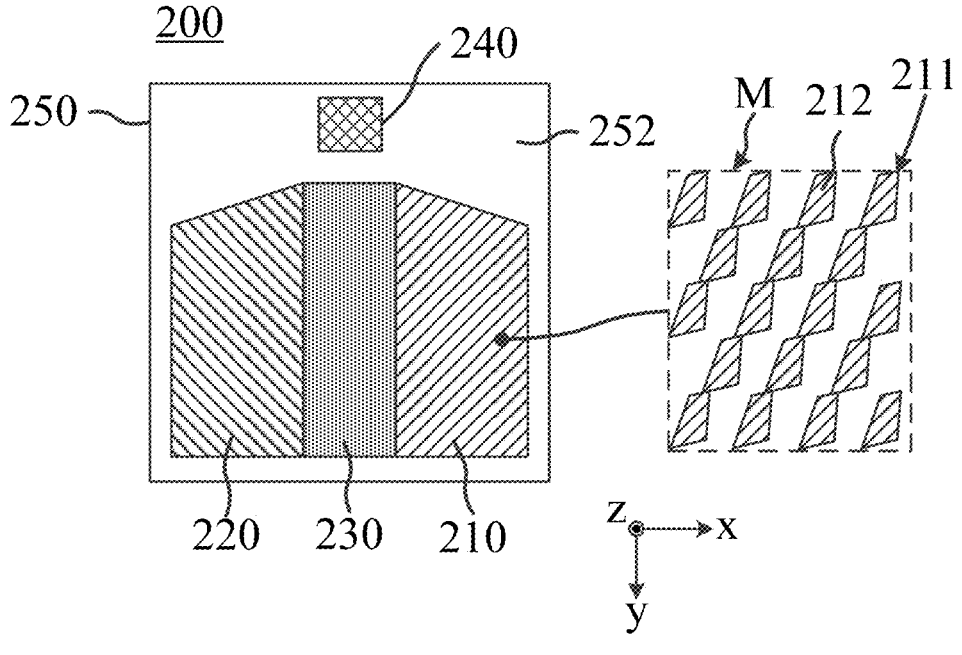
FIG. 10 is a schematic view of an optical structure and a partial structural view of a first coupling-out grating of the optical structure provided by the embodiments of the present disclosure.
FIG. 11 is a partial structural view of a first coupling-out grating in an optical structure provided by the embodiments of the present disclosure.
Figures 12, 13:
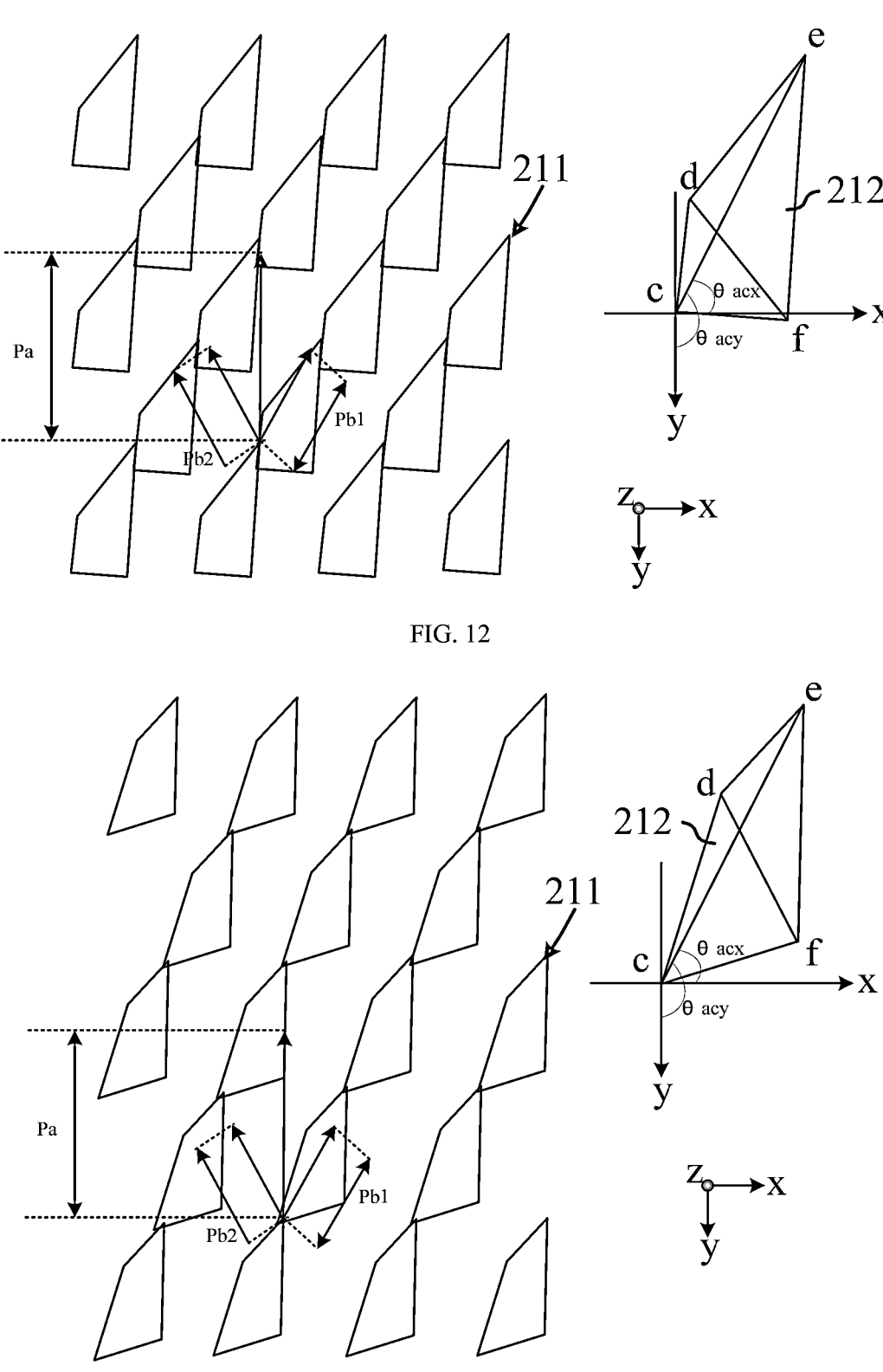
FIG. 12 is a partial structural view of a first coupling-out grating in an optical structure provided by the embodiments of the present disclosure.
FIG. 13 is a partial structural view of a first coupling-out grating in an optical structure provided by the embodiments of the present disclosure.

As illustrated in FIG. 10 to FIG. 13, FIG. 10 is a partial structural schematic view of an optical structure and a first coupling-out grating in the optical structure provided by the embodiments of the present disclosure, FIG. 11 is a first coupling-out grating in an optical structure provided by the embodiments of the present disclosure, FIG. 12 is a partial structural schematic view of a first coupling-out grating in an optical structure provided by the embodiments of the present disclosure, FIG. 13 is a partial structural schematic view of a first coupling-out grating in an optical structure provided by the embodiments of the present disclosure. A partial structure M of the first coupling-out grating 210 illustrated in FIG. 10 is defined as a first part M. In other words, the plurality of the first grids 212 in the first part M are part of the first grids 212 of the first coupling-out grating 210.

All the first grids 212 of the plurality of the first grids 212 of the first coupling-out grating 210 may have substantially the same shape. For example, each first grid 212 has four vertices such as a vertex c, a vertex d, a vertex e, and a vertex f. The four vertices may form a first diagonal line ce and a second diagonal line df A length of the first diagonal line ce is greater than a length of the second diagonal line df, an angle θacx between the first diagonal line ac and the third coupling-out grating 230 along the third direction is an acute angle, and an angle θacy between the second diagonal line bd and the third coupling-out grating along the third direction is an obtuse angle.

The third direction is a direction in which the third coupling-out grating 230 faces the coupling-in grating 240.

In an embodiment of the present disclosure, the first grids 212 of the same shape are periodically arranged in a hexagonal lattice on the x-y plane. The first grids 212 have two periodic directions, namely periodic direction a and periodic direction b. An angle between the periodic direction a and the periodic direction b is 30°. The periodic direction a is parallel to the y-axis, a distance between two first grids 212 along the periodic direction a is Pa, the periodic direction b forms an angle of 30° with the y-axis, and a distance between two first grids 212 along the periodic direction is Pb. Pa may be 0.4 μm to 3 μm, and Pb may be 0.2 μm to 2 Pa and Pb need to satisfy the relationship: Pa=Pb/2 cos (30°).

The asymmetric shape of the first grid 212 in the embodiments of the present disclosure may also be understood as the shape of the first grid 212 that is asymmetrical with respect to both the x-axis and the y-axis. The diagonal ce is always greater than the second diagonal df, and the angle θacy between the first diagonal ce and the positive direction of the y-axis is an obtuse angle, and the angle θacx between the first diagonal ce and the positive direction of the x-axis is an acute angle.

The first coupling-out grating 210 has a plurality of the grid groups 211. Each grid group 211 includes a plurality of the first grids 212, and each first grid 212 in each grid group 211 intersects with its adjacent first grid 212. Each grid group 211 is spaced apart from each other. In an embodiment of the present disclosure, each grid group 211 is parallel to each other. Each first grid in each grid group 211 is arranged along a sixth direction. An upper right part and lower left part of each first grid 212 intersects the next adjacent first grid 212 along the diagonal direction.

The sixth direction is a direction in which a seventh direction rotates 30 degrees clockwise, and the seventh direction is a direction in which the third coupling-out grating 230 faces the coupling-in grating 240. The seventh direction may also be understood as the positive direction of Pa, that is, the sixth direction is the direction of Pb 1.

A number of vertices of the first grid 211 is not limited to four. For example, the first grid includes at least five vertices, that is, the first grid 211 may have five or more vertices. The embodiments of the present disclosure take five vertices as an example for description.

Figure 14:
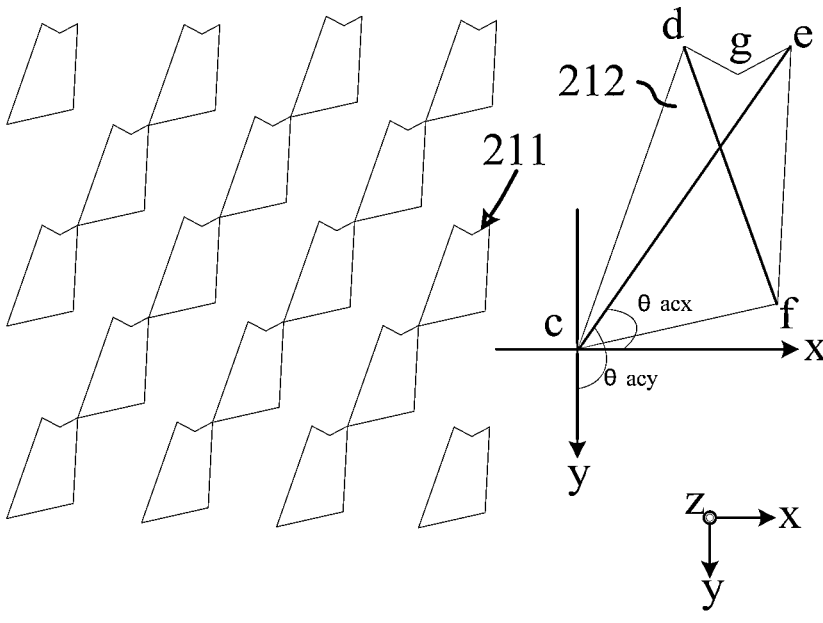
FIG. 14 is a partial structural view of a first coupling-out grating in an optical structure provided by the embodiments of the present disclosure.

As illustrated in FIG. 14, FIG. 14 is a partial structural view of a first coupling-out grating in an optical structure provided by the embodiments of the present disclosure. The vertices of the first grid 212 include two vertices (a vertex c and a vertex d) close to the third coupling-out grating 230 and two vertices (a vertex e and a vertex f) away from the third coupling-out grating 230. The two vertices (the vertex c and the vertex d) close to the third coupling-out grating 230 and the two vertices (the vertex e and the vertex f) away from the third coupling-out grating 230 may form a third diagonal line ce and a fourth diagonal line df. A length of the third diagonal line ce is greater than a length of the fourth diagonal line df, an angle between the third diagonal line ce and the third coupling-out grating 230 along the fourth direction is an acute angle, and an angle between the fourth diagonal line df and the coupling-out grating 230 along the fourth direction is an obtuse angle.

The fourth direction is a direction in which the third coupling-out grating 230 faces the coupling-in grating 240. In other words, the fourth direction may be understood as the third direction. For the third diagonal line ce and the fourth diagonal line df, it may be referred to the third diagonal line ce and the fourth diagonal line df illustrated in FIG. 11 to FIG. 13, and will be described again here. For the first grid 212 and the grid group 211, it may be referred to the first grid 212 and the grid group 211 illustrated in FIG. 11 to FIG. 13, and will be described again here.

The number of vertices of the first grid 211 is not limited to four, five, or more than five. For example, the first grid includes three vertices, that is, the first grid 211 may have three vertices.

Figure 15:
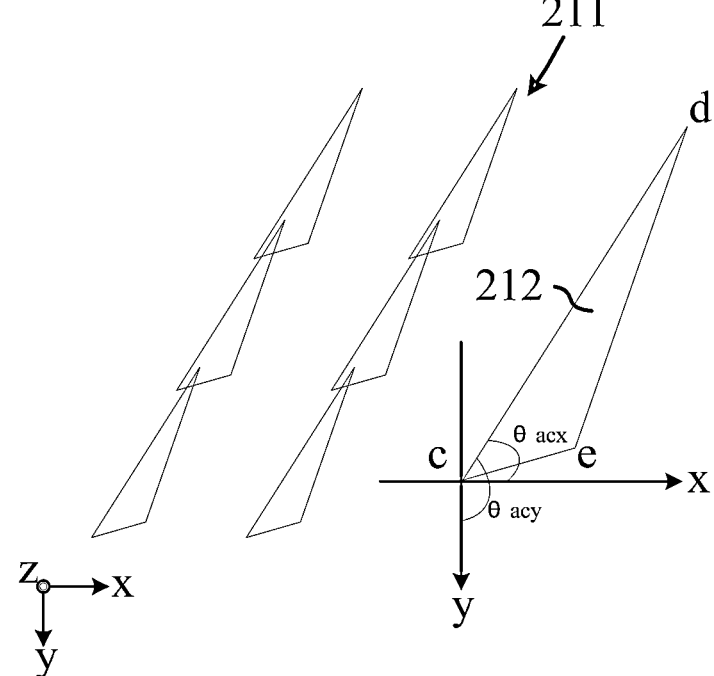
FIG. 15 is a partial structural view of a first coupling-out grating in an optical structure provided by the embodiments of the present disclosure.

As illustrated in FIG. 15, FIG. 15 is a partial structural view of a first coupling-out grating in an optical structure provided by the embodiments of the present disclosure. The vertices of the first grid 212 include a vertex c, a vertex d and a vertex e close to each other. The vertex c, the vertex d and the vertex e are connected to each other to form a first vertex-connecting line cd, a second vertex-connecting line de and a third vertex-connecting line ce. The first vertex-connecting line cd is close to the third coupling-out grating 230, the second vertex-connecting line de is away from the third coupling-out grating 230, and a length of the first vertex-connecting line cd is greater than a length of the second vertex-connecting line de. An angle between the vertex-connecting line cd and the third coupling-out grating 230 along a fifth direction is an acute angle, and an angle between the second vertex-connecting line de and the third coupling-out grating 230 along the fifth direction is an obtuse angle.

The fifth direction is a direction in which the third coupling-out grating 230 faces the coupling-in grating 240. That is, the fifth direction may be understood as the third direction. For the first vertex-connecting line cd and the second vertex-connecting line de, it may be referred to the third diagonal ce and the fourth diagonal df illustrated in FIG. 11 to FIG. 13, and will be described again here. For the first grid 212 and the grid group 211, it may be referred to the first grid 212 and the grid group 211 illustrated in FIGS. 11 to 13, and will be described again here.

In the embodiments of the present disclosure, the first coupling-out grating 210 and the second coupling-out grating 220 have the same shape, and the first coupling-out grating 210 and the second coupling-out grating 220 are symmetrically arranged relative to the third coupling-out grating 230, which may also be understood as the first coupling-out grating 210 and the second coupling-out grating 220 are arranged in mirror images relative to the third coupling-out grating 230. In other words, the plurality of grids of the second coupling-out grating 220 are all two-dimensional grids, and the shape and arrangement of the grid structure of each two-dimensional gird are the same as those of the first grating 212. For example, the second coupling-out grating 220 is a two-dimensional grating with a plurality of second grids, and all the second grids of the second coupling-out grating 220 have the same shape and arrangement as those of all the first grids of the first coupling-out grating 210. The specific shape and arrangement may be seen in FIG. 11 to FIG. 15 and may not be described again here.

The third coupling-out grating 230 is a two-dimensional grating with a plurality of third grids. The third grid has a symmetrical shape, such as a left-right symmetrical two-dimensional grid, such that the light propagation efficiency to the left is the same as the light propagation efficiency to the right, which is beneficial to increasing the size of the eyebox 260 in the edge field-of-view. The third grid may be arranged in a hexagonal lattice, and the grating vector may be seen in FIG. 9. Its (1,1) order diffraction vector is parallel to the y-axis. The third grid may be any shape that is symmetrical along the y-axis, such as a circle, a positive direction, a rhombus, a hexagon, an octagon, etc. An area of the third coupling-out grating 230 may be rectangular, for example, a lateral width along the x-axis direction may be 1 mm to 15 mm, and a longitudinal width along the y-axis direction may be 20 mm-35 mm.

In an embodiment of the present disclosure, grating periods of the first coupling-out grating 210, the second coupling-out grating 220 and the third coupling-out grating 230 are equal. Either one of a refractive index of the first coupling-out grating 210, the second coupling-out grating 220 and the third coupling-out grating 230 to the waveguide 250 is 1.5-3. The grating period of the coupling-in grating 240 is one-half of the grating period of any one of the first coupling-out grating 210, the second coupling-out grating 220 and the third coupling-out grating 230 along a direction perpendicular to the first direction. In other words, the grating period of the coupling-in grating 240 is one-half of the grating period of any one of the first coupling-out grating 210, the second coupling-out grating 220, and the third coupling-out grating 230 along the y-axis direction.

Materials of the coupling-in grating 240, the first coupling-out grating 210, the second coupling-out grating 220 and the third coupling-out grating 230 may be silicon, plastic, glass, polymer or some combination of the above.

As illustrated in FIG. 2, a display brightness at any position of the eyebox 260 is determined by the intensity of the coupled light at that position. Therefore, the intensity of the light 2012, the light 2013A, and the light 2014A directly determines the display quality of the eyebox 260. In actual applications, the intensity of the light 2012 is significantly weaker than that of the light 2013A and the light 2014A, resulting in an obvious dark area in the eyebox 260 corresponding to the position of the light 2012, which may greatly affect consumer experience. The reason why the intensity of the light 2012 is weaker than that of the light 2013A and the light 2014A lies in that coupling efficiency of the third coupling-out grating 230 may not be arranged too high, otherwise the main light 201 may attenuate too quickly during propagation process, and the light 201 that attenuates too quickly may result difference in light intensity between the light 2012, and may eventually cause more severe uneven brightness of the eyebox 260.

Based on this, the embodiments of the present disclosure propose an optical structure to improve light coupling efficiency of the third coupling-out grating 230 without causing intensity difference between the light 2012. For example, in the optical structure 200 of the embodiments of the present disclosure, the third coupling-out grating 230 is divided into multiple areas along the y-axis, and efficiency of different areas along the y-axis is gradually increased. In this way, although the main light 201 may attenuate during the propagation process, efficiency of the light 2012 and the subsequent out-coupled light being coupled out by the coupling-out grating is gradually improved. Therefore, although the attenuation of the main light 201 is accelerated due to the improvement of the efficiency of the third coupling-out grating 230, the energy difference between the light 2012 and the subsequent out-coupled light may be reduced, thereby making the energy of the light 2012 be close to the light 2013A and the light 2014A and the intensity difference between the light 2012 be reduced, which ultimately improves the brightness and brightness uniformity of the eyebox 260. The energy and brightness uniformity of the eyebox 260 are greatly improved. In summary, the embodiments of the present disclosure introduce the solution of partitioning the third coupling-out grating 230 into multiple gratings, which solves the above problem and greatly improves the energy and brightness uniformity of the eyebox 260. In this way, the embodiments of the present disclosure have greater implementation significance and propose a diffraction waveguide architecture with excellent performance.

The third coupling-out grating 230 in the embodiments of the present disclosure includes at least two sub-coupling-out gratings. A junction of two adjacent sub-coupling-out gratings is located within the eyebox 260 of the optical structure 200, and diffraction efficiency of the sub-coupling-out grating away from coupling-in grating 240 is greater than the diffraction efficiency of the sub-coupling-out grating close to the coupling-in grating 240. Therefore, the overall energy of the light coupled out by the third coupling-out grating 230 may be approximately the same, or the energy of the light coupled out by each sub-coupling-out grating of the third coupling-out grating 230 is approximately the same. And it may not affect the intensity of the light coupled out by the third coupling-out grating 230. Detailed description is given below with illustrations.

In an embodiment of the present disclosure, a grating depth of the sub-coupling-out grating away from the coupling-in grating 240 is greater than a grating depth of the sub-coupling-out grating close to the coupling-in grating 240, such that the diffraction efficiency of the sub-coupling-out grating away from the coupling-in grating 240 being greater than the diffraction efficiency of the sub-coupling-out grating close to the coupling-in grating 240 may be realized. In other words, in an embodiment of the present disclosure, the deeper the grating of the optical structure 200 is defined, the higher is its diffraction efficiency.

Figure 16:
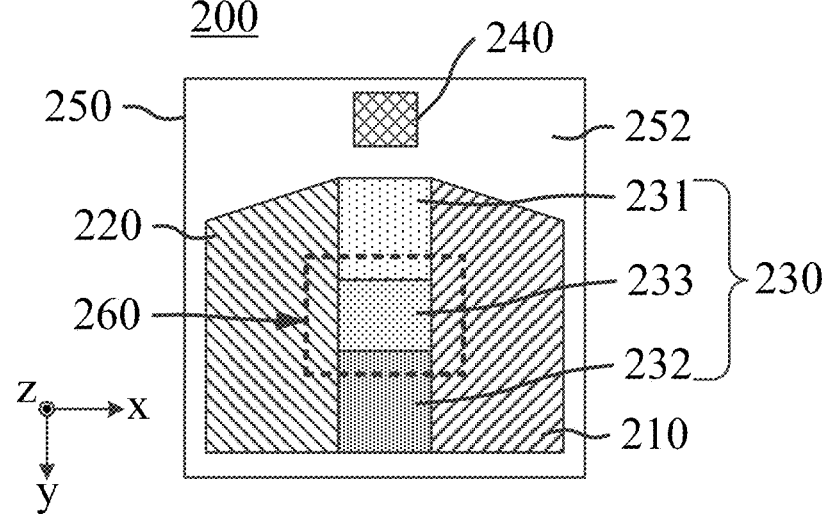
FIG. 16 is a schematic view of an optical structure provided by the embodiments of the present disclosure.
Figure 17:
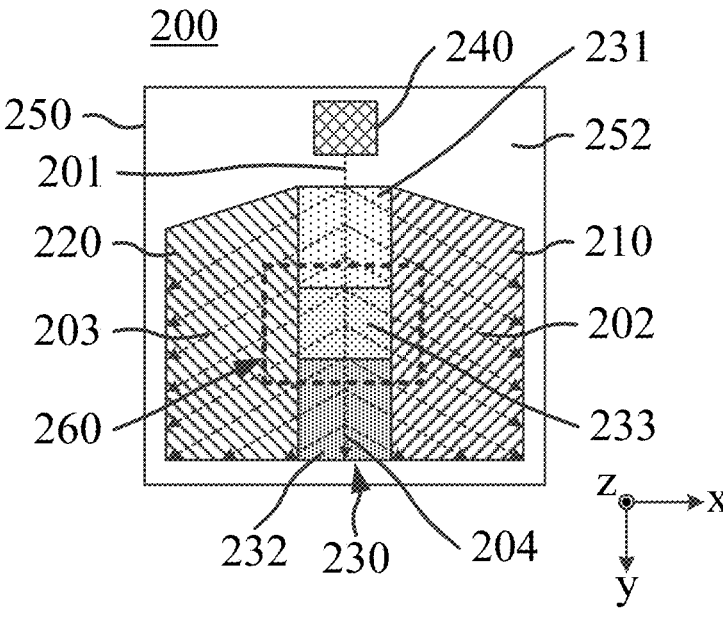
FIG. 17 is a schematic view of an optical structure provided by the embodiments of the present disclosure.

As illustrated in FIG. 16 and FIG. 17, FIG. 16 is a schematic view of an optical structure provided by the embodiments of the present disclosure, and FIG. 17 is a schematic view of an optical structure provided by the embodiments of the present disclosure. The third coupling-out grating 230 of the optical structure 200 may include three sub-coupling-out gratings, and at least a part of each sub-coupling-out grating is located within the eyebox 260. For example, the third coupling-out grating 230 includes a first sub-coupling-out grating 231 located partially on one side of the eyebox 260, a second sub-coupling-out grating 232 partially located on another side of the eyebox 260, and a third sub-coupling-out grating 2323 entirely located within the eyebox 260.

A length of the first sub-coupling-out grating 231 along an arrangement direction of all the sub-coupling-out gratings is greater than a length of the third sub-coupling-out grating 233 located within the eyebox 260 along the arrangement direction of all the sub-coupling-out gratings. In other words, the length of the first sub-coupling-out grating 231 along the y-axis direction is greater than the length of the third sub-coupling-out grating 233 located within the eyebox 260 along the y-axis direction.

A length of the second sub-coupling-out grating 232 along the arrangement direction of all sub-coupling-out gratings is greater than a length of the third sub-coupling-out grating 233 located within the eyebox 260 along the arrangement direction of all the sub-coupling-out gratings. In other words, the length of the second sub-coupling-out grating 232 along the y-axis direction is greater than the length of the third sub-coupling-out grating 233 located within the eyebox 260 along the y-axis direction.

In an embodiment of the present disclosure, the length of the second sub-coupling-out grating 232 along the arrangement direction of all sub-coupling-out gratings may be equal to the length of the first sub-coupling-out grating 231 along the arrangement direction of all sub-coupling-out gratings. The first sub-coupling-out grating 231 and the second sub-coupling-out grating 232 may be arranged symmetrically with respect to the third sub-coupling-out grating 233. Lengths of the first sub-coupling-out grating 231 and the second sub-coupling-out grating 232 along the arrangement direction of all the sub-coupling-out gratings may also be unequal.

In the embodiments of the present disclosure, the length of the first sub-coupling-out grating 231 along the arrangement direction of all the sub-coupling-out gratings and the length of the second sub-coupling-out grating 232 along the arrangement direction of all the sub-coupling-out gratings are larger than the length of the third sub-coupling-out grating 233 along the arrangement direction of all sub-coupling-out gratings. In the embodiments of the present disclosure, a ratio of the length of the first sub-coupling-out grating 231 along the arrangement direction of all the sub-coupling-out gratings to the length of all the sub-coupling-out grating is P1. In other words, the ratio of the length of the first sub-coupling-out grating 231 along the y-axis direction to the length of the third coupling-out grating 230 along the y-axis direction is P1. A ratio of the length of the third sub-coupling-out grating 233 along the arrangement direction of all sub-coupling-out gratings to the length of all sub-coupling-out gratings along the arrangement direction is P2. In other words, the ratio of the length of the third sub-coupling-out grating 233 along the y-axis direction to the length of the coupling-out grating 230 along the y-axis direction is P2. P1 is greater than or equal to 30%, P1 is less than or equal to 45%, P2 is greater than or equal to 10%, and P2 is less than 30%.

In an embodiment of the present disclosure, a size of a part of the first sub-coupling-out grating 231 located within the eyebox 260 and a part of the second sub-coupling-out grating 232 located within the eyebox 260 are the same. As illustrated in FIG. 5 and FIG. 6, an intersection of the sub-coupling-out gratings of the third coupling-out grating 230 is located within a range of B/2 above and below a center of the third coupling-out grating 230.

In an embodiment of the present disclosure, from a sub-coupling-out grating closest to the coupling-in grating 240, such as the first sub-coupling-out grating 231, to a sub-coupling-out grating farthest from the coupling-in grating 240, such as the second sub-coupling-out grating, the diffraction efficiency of all the sub-coupling-out gratings along the direction of the grating-out 232 increases equally. In other words, the diffraction efficiency of all the sub-coupling-out gratings along the positive direction of the y-axis increases equally. For example, the diffraction efficiency of the third sub-coupling-out grating 233 is n times that of the first sub-coupling-out grating 231, and n is greater than 1. The diffraction efficiency of the second sub-coupling-out grating 232 is n times that of the third sub-coupling-out grating 233. This ensures that the energy of light coupled out by each sub-coupling-out grating is not significantly different.

The structure of the third coupling-out grating 230 being divided into three regions illustrated in FIG. 16 and FIG. 17 is only exemplary and does not constitute a limitation on the number of subregions of the third coupling-out grating 230. For example, the third coupling-out grating 230 may include two sub-coupling-out gratings, four sub-coupling-out gratings, five sub-coupling-out gratings, and so on. A larger number of the sub-coupling-out gratings may not be explained one by one here.

When the number of the sub-coupling-out gratings of the third coupling-out grating 230 is greater than three, such as four or five, it is still satisfied that the junction of two adjacent sub-coupling-out gratings of all the sub-coupling-out gratings of the third coupling-out grating 230 are within the eyebox 260 of the optical structure 200. The diffraction efficiency of the sub-coupling-out gratings away from the coupling-in grating 240 is greater than the diffraction efficiency of the sub-coupling-out gratings close to the coupling-in grating 240. Likewise, the overall energy of the light coupled out by the third coupling-out grating 230 may be approximately the same, or the energy of the light coupled out by each sub-coupling-out grating of the third coupling-out grating 230 is approximately the same. And it may not affect the intensity of the light coupled out by the third coupling-out grating 230.

When the number of the sub-coupling-out gratings of the third coupling-out grating 230 is greater than three, such as four or five. At least a part of all the sub-gratings of the third coupling-out grating 230 may be located within the eyebox 260. In other words, the third coupling-out grating 230 includes a sub-coupling-out grating partially located on one side of the eyebox 260, a sub-coupling-out grating partially located on another side of the eyebox 260, and two or more sub-coupling-out gratings completely located within the eyebox 260. A sum of the lengths of all the sub-coupling-out gratings that are completely located withinside the eyebox 260 along the arrangement direction of all the sub-coupling-out gratings of the third coupling-out grating 230 is smaller than the length of any sub-coupling-out grating that is partially located outside the eyebox 260 along the arrangement direction of all the sub-coupling-out gratings of the sub-coupling-out gratings 230. In other words, the sum of the lengths of all the sub-coupling-out gratings that are completely located within the eyebox 260 along the y-axis direction is smaller than the length of any sub-coupling-out grating that is partially located outside the eyebox 260 along the y-axis direction.

Compared with FIG. 16 and FIG. 17, a ratio of the sum of the lengths of the at least two sub-coupling-out gratings of the third coupling-out grating 230 which are completely located within the eyebox 260 along the y-axis direction to the length of the third coupling-out grating 230 along the y-axis direction is P2. The remaining features may be seen in FIG. 16 and FIG. 17 and will not be described again here.

Figure 18:
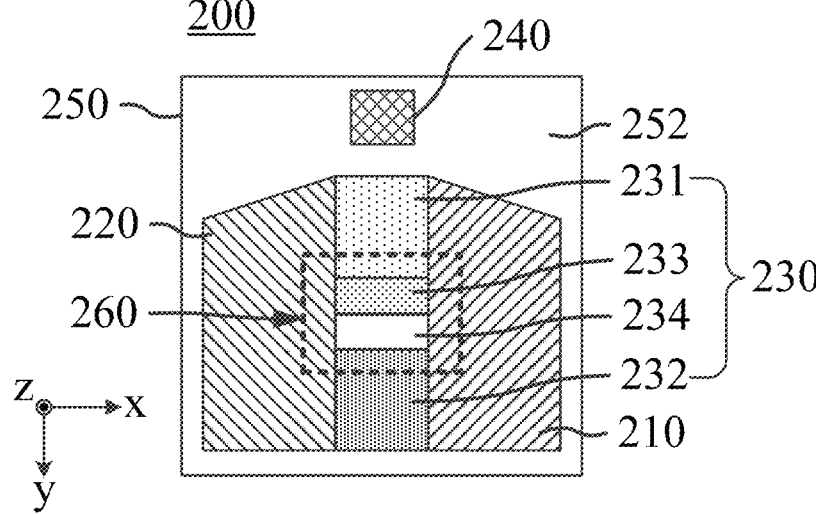
FIG. 18 is a schematic view of an optical structure provided by the embodiments of the present disclosure.

As illustrated in FIG. 18, FIG. 18 is a schematic view of an optical structure provided by the embodiments of the present disclosure. FIG. 18 illustrates that the third coupling-out grating 230 includes four sub-coupling-out gratings, namely the first sub-coupling-out grating 231, the second sub-coupling-out grating 232, the third sub-coupling-out grating 233 and the fourth sub-coupling-out grating 234. For the first sub-coupling-out grating 231 and the second sub-coupling-out grating 232, it may be referred to the above content and will not be described again here. The third sub-coupling-out grating 233 and the fourth sub-coupling-out grating are both located within the eyebox 260.

Figure 19:
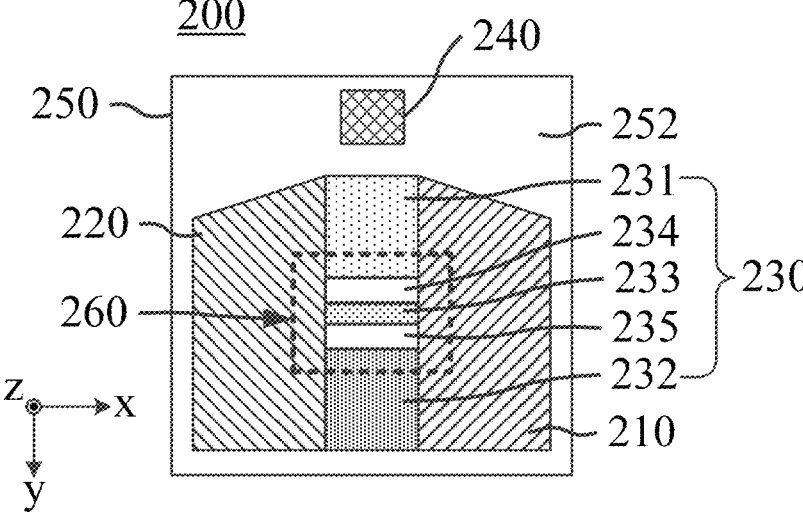
FIG. 19 is a schematic view of an optical structure provided by the embodiments of the present disclosure.

As illustrated in FIG. 19, FIG. 19 is a schematic view of an optical structure provided by the embodiments of the present disclosure. FIG. 19 illustrates that the third coupling-out grating 230 includes five sub-coupling-out gratings, namely the first sub-coupling-out grating 231, the second sub-coupling-out grating 232, the third sub-coupling-out grating 233, the fourth sub-coupling-out grating 234 and the fifth sub-coupling-out grating 235. For the first sub-coupling-out grating 231 and the second sub-coupling-out grating 232, it may be referred to the above content and will not be described again here. The third sub-coupling-out grating 233, the fourth sub-coupling-out grating and the fifth sub-coupling-out grating are all located within the eyebox 260.

Considering that the intensity of the light 2012, the light 2013A, and the light 2014A directly determines the display quality of the eyebox 260, in actual applications, the intensity of the light 2012 is significantly weaker than that of the light 2013A and the light 2014A. In some embodiments of the present disclosure, the third coupling-out grating 230 capable of coupling out the light 2012 is arranged in different regions, which may make the energy of the light 2012 closer to that of the light 2013A and the light 2014A while reducing the intensity difference between the light 2012. Therefore, the brightness and brightness uniformity of eyebox 260 is improved, and the energy and brightness uniformity of the eyebox 260 is greatly improved. In actual applications, the energy of the light 2013A and the light 2014A may also be lost during propagation process. In order to further improve the brightness and brightness uniformity of the eyebox 260, in some embodiments of the present disclosure, the first coupling-out grating 210 and the second coupling-out grating 220 are also arranged in different regions. Detailed description is given below with illustrations.

Figure 20:
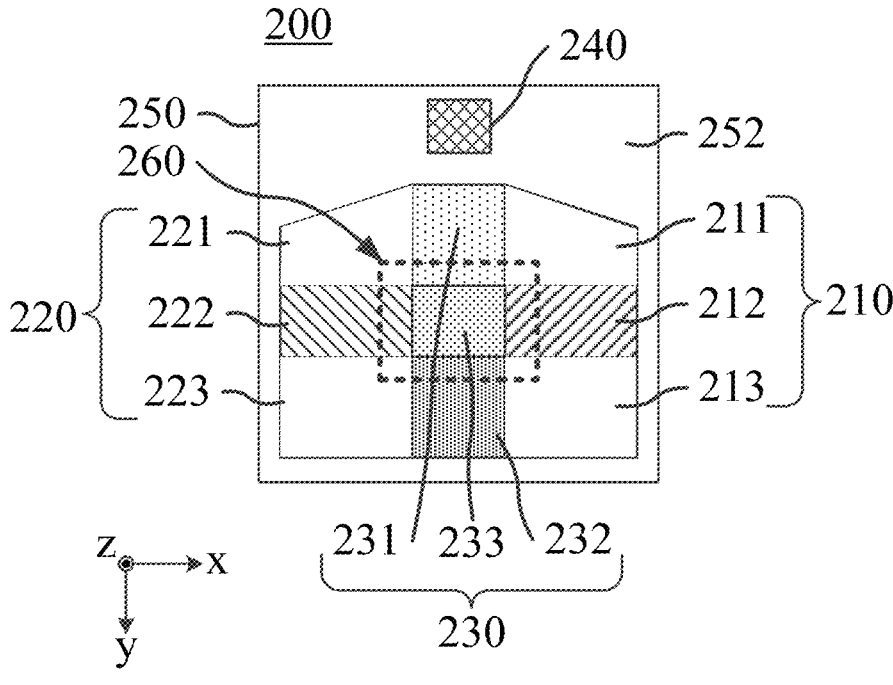
FIG. 20 is a schematic view of an optical structure provided by the embodiments of the present disclosure.

As illustrated in FIG. 20, FIG. 20 is a schematic view of an optical structure provided by the embodiments of the present disclosure. The first coupling-out grating 210, the second coupling-out grating 220 and the third coupling-out grating 230 in the optical structure 200 illustrated in FIG. 20 are arranged in different regions. The sub-region arrangement of the third coupling-out grating 230 may be referred to FIG. 16 to FIG. 19, and will be described again here.

The first coupling-out grating 210 includes at least two sub-coupling-out gratings, and the number of the sub-coupling-out gratings of the first coupling-out grating 210 is the same as the number of the sub-coupling-out gratings of the third coupling-out grating 230. For example, the number is three. And a junction of two adjacent sub-coupling-out gratings of the first coupling-out grating 210 is located within the eyebox 260 of the optical structure 200. The diffraction efficiency of the sub-coupling-out grating away from the coupling-in grating 240 of the first coupling-out grating 210 is greater than the diffraction efficiency of the sub-coupling-out grating close to the coupling-in grating 240. Therefore, the overall energy of the light coupled out by the first coupling-out grating 210 may be approximately the same, or the energy of the light coupled out by each sub-coupling-out grating 210 of the first coupling-out grating 210 is approximately the same. And it may not affect the intensity of light coupled out by the first coupling-out grating 210.

Three sub-coupling-out gratings of the first coupling-out grating 210 illustrated in FIG. 20 are described as an example. The first coupling-out grating 210 includes a first sub-coupling-out grating 211, a second sub-coupling-out grating 212 and a third sub-coupling-out grating 213. It may be referred to the first sub-coupling-out grating 231 for the first sub-coupling-out grating 211, it may be referred to the third sub-coupling-out grating 233 for the second sub-coupling-out grating 212, and it may be referred to the second sub-coupling-out grating 213 for the third sub-coupling-out grating 213, which will not be described again here. When the number of the sub-regions of the first coupling-out grating 210 and the number of the sub-regions of the third coupling-out grating 230 are both greater than three, it may be referred to FIG. 18 and FIG. 19. When two, three or more sub-coupling-out gratings are arranged between the first sub-coupling-out grating 211 and the third sub-coupling-out grating 213, the arrangement is the same as the arrangement of the sub-coupling-out gratings of the third sub-coupling-out grating 230, which will not be repeated here.

The second coupling-out grating 220 includes at least two sub-coupling-out gratings, and the number of the sub-coupling-out gratings of the second coupling-out grating 220 is the same as the number of the sub-coupling-out gratings of the third coupling-out grating 230. For example, the number may be three. And a junction of two adjacent sub-coupling-out gratings of the second coupling-out grating 220 is located within the eyebox 260 of the optical structure 200. The diffraction efficiency of the sub-coupling-out grating away from the coupling-in grating 240 of the second coupling-out grating 220 is greater than the diffraction efficiency of the sub-coupling-out grating close to the coupling-in grating 240. Therefore, the overall energy of the light coupled out by the second coupling-out grating 220 may be approximately the same, or the energy of the light coupled out by each sub-coupling-out grating of the second coupling-out grating 220 is approximately the same. And it may not affect the intensity of the light coupled out by the second coupling-out grating 220.

Three sub-coupling-out gratings of the second coupling-out grating 220 illustrated in FIG. 20 are described as an example. The second coupling-out grating 210 includes a first sub-coupling-out grating 221, a second sub-coupling-out grating 222 and a third sub-coupling-out grating 223. For the first sub-coupling-out grating 221, it may be referred to the first sub-coupling-out grating 231; for the second sub-coupling-out grating 222, it may be referred to the third sub-coupling-out grating 233, and for the third sub-coupling-out grating 223, it may be referred to the second sub-coupling-out grating 223, which will not be described again here. When the number of sub-regions of the second coupling-out grating 220 and the number of sub-regions of the third coupling-out grating 230 are both greater than three, it may be referred to FIG. 18 and FIG. 19. When two sub-coupling-out gratings, three sub-coupling-out gratings or more sub-coupling-out gratings are arranged between the first sub-coupling-out grating 221 and the third sub-coupling-out grating 223, the arrangement is the same as the arrangement of the sub-coupling-out gratings of the third sub-coupling-out grating 230, which will not be repeated here.

In some embodiments of the present disclosure, only one of the first coupling-out grating 210, the second coupling-out grating 220 and the third coupling-out grating 230 is arranged in a sub-regional manner, which is also within the scope defined by in the present disclosure. Besides that, arranging only two of the first coupling-out grating 210, the second coupling-out grating 220 and the third coupling-out grating 230 in a sub-regional manner is also within the scope defined by the embodiments of the present disclosure.

When the third coupling-out grating 230 includes a plurality of the sub-coupling-out gratings, the first coupling-out grating 210, the second coupling-out grating 220 and the third coupling-out grating 230 may all be two-dimensional gratings, such as those illustrated in FIG. 1 to FIG. 15, which may not be repeated here. When the third coupling-out grating 230 includes the plurality of the sub-coupling-out gratings, the first coupling-out grating 210 and the second coupling-out grating 220 may also adopt other grating structures such as one-dimensional gratings. When the first coupling-out grating 210 and the second coupling-out grating 220 adopt a one-dimensional grating, the third coupling-out grating 230 adopts a two-dimensional grating, and the coupling-in grating 240 adopts a one-dimensional grating. The grating periods of the coupling-out grating 220 and the coupling-in grating 240 are equal. The grating periods of all sub-coupling-out gratings of the third coupling-out grating 230 along the arrangement direction of all the sub-coupling-out gratings are twice of the grating period of any one of the first coupling-out grating 210, the second coupling-out grating 220 and the coupling-in grating 240.

The optical structure 200 defined in the above embodiments of the present disclosure may be applied to an optical device, and the optical device may include a projector and any of the above optical structure 200. The optical device may be an augmented reality device or a virtual reality device.

The optical structure and optical device provided by the embodiments of the present disclosure have been introduced in detail above. Specific examples are used in this article to illustrate the principles and implementation methods of the present disclosure. The description of the above embodiments is only used to help understand the methods and core ideas of the present disclosure. For those skilled in the art, there may be changes in the specific implementation and application scope based on the ideas of the present disclosure. In summary, the content of this specification should not be understood as an infringement of the present disclosure.

What is claimed is:

1. An optical structure, comprising:
   a waveguide;
   a first coupling-out grating, arranged on the waveguide;
   a second coupling-out grating, arranged on the waveguide; and
   a third coupling-out grating, arranged on the waveguide, wherein the third coupling-out grating is located between the first coupling-out grating and the second coupling-out grating;
   wherein the first coupling-out grating is a two-dimensional grating with a plurality of first grids, the first grid has an asymmetric shape to allow light propagation efficiency of the first coupling-out grating along a first direction is higher than light propagation efficiency of the first coupling-out grating along a second direction; and
   wherein the first direction is a direction in which the first coupling-out grating faces the second coupling-out grating, and the first direction is opposite to the second direction.

2. The optical structure according to claim 1, further comprising a coupling-in grating, wherein the coupling-in grating is arranged at a same side of the first coupling-out grating, the second coupling-out grating and the third coupling-out grating, and the coupling-in grating and the third coupling-out grating are arranged side by side;
   wherein the first grid comprises three vertices and has a first vertex-connecting line, a second vertex-connecting line and a third vertex-connecting line, the first vertex-connecting line is close to the third coupling-out grating, the second vertex-connecting line is away from the third coupling-out grating, a length of the first vertex-connecting line is greater than a length of the second vertex-connecting line, an angle between the first vertex-connecting line and the third coupling-out grating along a five direction is an acute angle, and an angle between the second vertex-connecting line and the third coupling-out grating in the fifth direction is an obtuse angle; and
   wherein the fifth direction is a direction in which the third coupling-out grating faces the coupling-in grating.

3. The optical structure according to claim 1, further comprising a coupling-in grating, wherein the coupling-in grating is arranged at a same side of the first coupling-out grating, the second coupling-out grating and the third coupling-out grating, and the coupling-in grating and the third coupling-out grating are arranged side by side;
   wherein the first grid comprises at least five vertices, and the vertices of the first grid comprise two vertices close to the third coupling-out grating and three vertices away from the third coupling-out grating, the two vertices close to the third coupling-out grating and the three vertices away from the third coupling-out grating are capable of forming a third diagonal line and a fourth diagonal line, a length of the third diagonal line is greater than a length of the fourth diagonal line, an angle between the third diagonal line and the third coupling-out grating along a fourth direction is an acute angle, and an angle between the fourth diagonal line and the third coupling-out grating along the fourth direction is an obtuse angle;

wherein the fourth direction is a direction in which the third coupling-out grating faces the coupling-in grating.

4. The optical structure according to claim 1, further comprising a coupling-in grating, wherein the coupling-in grating is arranged at a same side of the first coupling-out grating, the second coupling-out grating and the third coupling-out grating, and the coupling-in grating and the third coupling-out grating are arranged side by side;

wherein the first grid comprises four vertices capable of forming a first diagonal line and a second diagonal line, a length of the first diagonal line is greater than a length of the second diagonal line, an angle between the first diagonal line and the third coupling-out grating along a third direction is an acute angle, and an angle between the second diagonal line and the third coupling-out grating along the third direction is an obtuse angle; and wherein the third direction is a direction in which the third coupling-out grating faces the coupling-in grating.

5. The optical structure according to claim 4, wherein the first coupling-out grating has a plurality of grid groups, each grid group comprises a plurality of the first grids, each first grid in each grid group intersects with its adjacent first grid, and each grid group is spaced apart from each other.

6. The optical structure according to claim 5, wherein each grid group is parallel to each other, or each first grid in each grid group is arranged along a sixth direction, the sixth direction is a direction in which a seventh direction rotates 30 degrees clockwise, and the seventh direction is a direction in which the third coupling-out grating faces the coupling-in grating.

7. The optical structure according to claim 4, wherein the third coupling-out grating is a two-dimensional grating with a plurality of third grids, and the third grid has a symmetrical shape;

the first coupling-out grating, the second coupling-out grating and the third coupling-out grating are all two-dimensional gratings, grating periods of the first coupling-out grating, the second coupling-out grating and the third coupling-out grating are equal, and refractive index of either of the first coupling-out grating, the second coupling-out grating and the third coupling-out grating to the waveguide is 1.5-3; and a grating period of the coupling-in grating is one-half of a grating period of the first coupling-out grating along a direction perpendicular to the first direction.

8. The optical structure according to claim 1, wherein the third coupling-out grating comprises at least two sub-coupling-out gratings, a junction of two adjacent sub-coupling-out gratings is located within an eyebox of the optical structure, and diffraction efficiency of the sub-coupling-out grating away from the coupling-in grating is greater than diffraction efficiency of the sub-coupling-out grating close to the coupling-in grating.

9. The optical structure according to claim 8, wherein the third coupling-out grating comprises at least three sub-coupling-out gratings, the at least three sub-coupling-out gratings comprises a first sub-coupling-out grating partially located on one side of the eyebox, a second sub-coupling-out grating partially located on another side of the eyebox, and at least one sub-coupling-out grating completely located within the eyebox;

a length of the first sub-coupling-out grating along an arrangement direction of all the sub-coupling-out gratings is greater than a sum of lengths of the at least one sub-coupling-out grating located within the eyebox along the arrangement direction of all the sub-coupling-out gratings; and a length of the second sub-coupling-out grating along the arrangement direction of all the sub-coupling-out gratings is greater than the sum of lengths of the at least one sub-coupling-out grating located within the eyebox along the arrangement direction of all the sub-coupling-out gratings.

10. The optical structure according to claim 8, wherein the first coupling-out grating comprises at least two sub-coupling-out gratings, a number of the sub-coupling-out gratings of the first coupling-out grating is equal to a number of the sub-coupling-out gratings of the third coupling-out grating, a junction of two adjacent sub-coupling-out gratings of the first coupling-out grating is located within the eyebox of the optical structure, and diffraction efficiency of the sub-coupling-out grating of the first coupling-out grating away from the coupling-in grating is greater than diffraction efficiency of the sub-coupling-out grating close to the coupling-in grating;

the second coupling-out grating comprises at least two sub-coupling-out gratings, a number of the sub-coupling-out gratings of the second coupling-out grating is the same as a number of the sub-coupling-out gratings of the third coupling-out grating, a junction of two adjacent sub-coupling-out gratings of the second coupling-out grating is located within the eyebox of the optical structure, and diffraction efficiency of the sub-coupling-out grating of the second coupling-out grating away from the coupling-in grating is greater than diffraction efficiency of the sub-coupling-out grating close to the coupling-in grating.

11. The optical structure according to claim 1, wherein the second coupling-out grating and the first coupling-out grating are arranged axially symmetrically with respect to the third coupling-out grating, the second coupling-out grating is a two-dimensional grating with a plurality of second grids, and all the second grids of the second coupling-out grating have a same shape and arrangement as those of all the first grids of the first coupling-out grating.

12. An optical structure, comprising:

a waveguide;

a first coupling-out grating, arranged on the waveguide;

a second coupling-out grating, arranged on the waveguide;

a third coupling-out grating, arranged on the waveguide, wherein the third coupling-out grating is located between the first coupling-out grating and the second coupling-out grating; and a coupling-in grating, arranged at a same side of the first coupling-out grating, the second coupling-out grating and the third coupling-out grating, wherein the coupling-in grating and the third coupling-out grating are arranged side by side;

wherein the third coupling-out grating comprises at least two sub-coupling-out gratings, a junction of two adjacent sub-coupling-out gratings is located within an eyebox of the optical structure, and diffraction efficiency of the sub-coupling-out grating away from the coupling-in grating is greater than diffraction efficiency of the sub-coupling-out grating close to the coupling-in grating.

13. The optical structure according to claim 12, wherein at least a part of all the sub-coupling-out gratings is located within the eyebox.

14. The optical structure according to claim 13, wherein the third coupling-out grating comprises at least three sub-coupling-out gratings, and the at least three sub-coupling-out gratings comprise a first sub-coupling-out grating partially located on one side of the eyebox, a second sub-coupling-out grating partially located on another side of the eyebox, and at least one sub-coupling-out grating completely located within the eyebox;

a length of the first sub-coupling-out grating along an arrangement direction of all the sub-coupling-out gratings is greater than a sum of lengths of the at least one sub-coupling-out grating located within the eyebox along the arrangement direction of all the sub-coupling-out gratings; and a length of the second sub-coupling-out grating along the arrangement direction of all the sub-coupling-out gratings is greater than the sum of lengths of the at least one sub-coupling-out grating located within the eyebox along the arrangement direction of all the sub-coupling-out gratings.

15. The optical structure according to claim 14, wherein a number of the sub-coupling-out gratings located completely within the eyebox is one, two or three, diffraction efficiency of all the sub-coupling-out grating increase proportionally along a direction from the sub-coupling-out grating closest to the coupling-in grating to the sub-coupling-out grating farthest from the coupling-in grating, or the first sub-coupling-out grating and the second sub-coupling-out grating are arranged symmetrically with respect to the sub-coupling-out grating completely located within the eyebox.

16. The optical structure according to claim 14, wherein a ratio of a length of the first sub-coupling-out grating or the second sub-coupling-out grating along the arrangement direction of all the sub-coupling-out gratings to a length of all the sub-coupling-out gratings is P1, a ratio of the length of all the sub-coupling-out gratings located completely within the eyebox along the arrangement direction of all the sub-coupling-out gratings to the length of all sub-coupling-out gratings is P2; and wherein P1 is greater than or equal to 30%, P1 is less than or equal to 45%, P2 is greater than or equal to 10%, and P2 is less than 30%.

17. The optical structure according to claim 12, wherein the first coupling-out grating comprises at least two sub-coupling-out gratings, and a number of the sub-coupling-out gratings of the first coupling-out grating is equal to a number of the sub-coupling-out gratings of the third coupling-out grating, a junction of two adjacent sub-coupling-out gratings of the first coupling-out grating is located within the eyebox of the optical structure, and diffraction efficiency of the sub-coupling-out grating of the first coupling-out grating away from the coupling-in grating is greater than diffraction efficiency of the sub-coupling-out grating close to the coupling-in grating; and the second coupling-out grating comprises at least two sub-coupling-out gratings, a number of the sub-coupling-out gratings of the second coupling-out grating is the same as a number of the sub-coupling-out gratings of the third coupling-out grating, a junction of two adjacent sub-coupling-out gratings of the second coupling-out grating is located within the eyebox of the optical structure, and diffraction efficiency of the sub-coupling-out of the second coupling-out grating away from the coupling-in grating is greater than the diffraction efficiency of the sub-coupling-out grating close to the coupling-in grating.

18. The optical structure according to claim 12, wherein the third coupling-out grating is a two-dimensional grating, the coupling-in grating is a one-dimensional grating, a grating period of the third coupling-out grating along an arrangement direction of all the sub-coupling-out gratings of the third coupling-out grating is twice a grating period of the coupling-in grating, the first coupling-out grating and the second coupling-out grating are both one-dimensional gratings, or both the first coupling-out grating and the second coupling-out grating are two-dimensional gratings;

a refractive index of any one of the first coupling-out grating, the second coupling-out grating, the third coupling-out grating and the coupling-in grating to the waveguide is 1.5-3;

periods of the first coupling-out grating, the second coupling-out grating and the coupling-in grating are equal, in response to the first coupling-out grating and the second coupling-out grating being one-dimensional gratings; and periods of the first coupling-out grating, the second coupling-out grating and the third coupling-out grating are equal, in response to the first coupling-out grating and the second coupling-out grating being two-dimensional gratings.

19. An optical device, comprising:

a projector, configured to provide augmented reality or virtual reality images; and a waveguide;

a first coupling-out grating, arranged on the waveguide;

a second coupling-out grating, arranged on the waveguide; and a third coupling-out grating, arranged on the waveguide, wherein the third coupling-out grating is located between the first coupling-out grating and the second coupling-out grating;

wherein the first coupling-out grating is a two-dimensional grating with a plurality of first grids, the first grid has an asymmetric shape to allow light propagation efficiency of the first coupling-out grating along a first direction is higher than light propagation efficiency of the first coupling-out grating along a second direction; and wherein the first direction is a direction in which the first coupling-out grating faces the second coupling-out grating, and the first direction is opposite to the second direction.

20. The optical device according to claim 19, further comprising a coupling-in grating, wherein the coupling-in grating is arranged at a same side of the first coupling-out grating, the second coupling-out grating and the third coupling-out grating, and the coupling-in grating and the third coupling-out grating are arranged side by side;

wherein the first grid comprises four vertices capable of forming a first diagonal line and a second diagonal line, a length of the first diagonal line is greater than a length of the second diagonal line, an angle between the first diagonal line and the third coupling-out grating along a third direction is an acute angle, and an angle between the second diagonal line and the third coupling-out grating along the third direction is an obtuse angle; and wherein the third direction is a direction in which the third coupling-out grating faces the coupling-in grating.

* * * * *